US007835028B2

(12) United States Patent
Ito

(10) Patent No.: US 7,835,028 B2
(45) Date of Patent: Nov. 16, 2010

(54) IMAGE FORMING APPARATUS WITH COLOR FORMING INFORMATION APPLYING UNIT THAT TRANSMITS LIGHT THROUGH IMAGE HOLDING MEMBER AND METHOD THEREOF

(75) Inventor: Isao Ito, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1027 days.

(21) Appl. No.: 11/604,044

(22) Filed: Nov. 24, 2006

(65) Prior Publication Data

US 2007/0273941 A1 Nov. 29, 2007

(30) Foreign Application Priority Data

May 23, 2006 (JP) ............................ 2006-142806

(51) Int. Cl.
*G06K 15/12* (2006.01)

(52) U.S. Cl. ......................... 358/1.7; 358/1.1; 399/107; 399/116; 399/130; 399/148; 399/159; 399/177; 399/178; 399/179; 399/296; 399/306; 430/21; 430/31; 430/42.1; 430/45.1; 430/45.3; 430/45.5; 430/45.55; 430/45.56; 430/46.1; 430/48; 430/49.1; 430/56; 430/57.1; 430/138; 430/494

(58) Field of Classification Search .................. 358/1.1, 358/1.7; 399/107, 116, 130, 148, 159, 177–179, 399/296, 306; 430/21, 31, 42.1, 45.1, 45.3, 430/45.5, 45.55, 45.56, 46.1, 48, 49.1, 56, 430/57.1, 138, 494
See application file for complete search history.

(56) References Cited

U.S. PATENT DOCUMENTS 3,512,967 A * 5/1970 Herrick, Jr. .................. 430/31
5,148,225 A * 9/1992 Takeda et al. ............... 399/139
5,196,886 A * 3/1993 Nakane et al. ................ 399/27
5,212,526 A * 5/1993 Domoto et al. .......... 430/124.4
5,557,394 A * 9/1996 Haneda et al. ................ 399/41
5,608,497 A * 3/1997 Haneda et al. .............. 399/153
5,660,960 A * 8/1997 Kinoshita et al. ............. 430/54

(Continued)

FOREIGN PATENT DOCUMENTS

JP A-63-311364 12/1988

(Continued)

OTHER PUBLICATIONS

Unpublished U.S. Appl. No. 11/603,842, filed Nov. 24, 2006 (Kimura et al.).

(Continued)

*Primary Examiner*—King Y Poon
*Assistant Examiner*—Kenneth Kwan
(74) *Attorney, Agent, or Firm*—Morgan, Lewis & Bockius LLP

(57) ABSTRACT

An image forming apparatus includes an image holding member, a toner image forming unit, a color forming information applying unit, a transfer unit, a fixing unit and a color forming unit, the color forming information applying unit exposing a toner image formed on a surface of the image holding member from a back surface side of the image holding member, light transmitted through the image holding member applying color forming information to the toner image.

16 Claims, 15 Drawing Sheets

U.S. PATENT DOCUMENTS

| | | | | | |
|---|---|---|---|---|---|
| 5,790,925 | A | * | 8/1998 | Doi et al. | 399/135 |
| 5,822,501 | A | * | 10/1998 | Hattori | 358/1.7 |
| 5,824,444 | A | * | 10/1998 | Kinoshita et al. | 430/57.3 |
| 6,017,672 | A | * | 1/2000 | Arai et al. | 430/138 |
| 6,833,852 | B1 | * | 12/2004 | Maess et al. | 347/188 |
| 2002/0142240 | A1 | * | 10/2002 | Katagiri et al. | 430/108.21 |
| 2004/0161694 | A1 | * | 8/2004 | Jimbo et al. | 430/138 |
| 2005/0084788 | A1 | * | 4/2005 | Yau et al. | 430/138 |
| 2005/0158644 | A1 | * | 7/2005 | Kondo et al. | 430/108.1 |

FOREIGN PATENT DOCUMENTS

JP A-2003-330228 11/2003

OTHER PUBLICATIONS

Unpublished U.S. Appl. No. 11/603,979, filed Nov. 24, 2006 (Maeyama).

Unpublished U.S. Appl. No. 11/603,980, filed Nov. 24, 2006 (Furuya).

Unpublished U.S. Appl. No. 11/604,024, filed Nov. 24, 2006 (Hara et al.).

Unpublished U.S. Appl. No. 11/604,025, filed Nov. 24, 2006 (Kashimura).

Unpublished U.S. Appl. No. 11/604,031, filed Nov. 24, 2006 (Ito).

Unpublished U.S. Appl. No. 11/604,036, filed Nov. 24, 2006 (Kimura et al.).

Unpublished U.S. Appl. No. 11/604,048, filed Nov. 24, 2006 (Kimura et al.).

Unpublished U.S. Appl. No. 11/604,049, filed Nov. 24, 2006 (Takegawa).

* cited by examiner

IMAGE FORMING APPARATUS WITH COLOR FORMING INFORMATION APPLYING UNIT THAT TRANSMITS LIGHT THROUGH IMAGE HOLDING MEMBER AND METHOD THEREOF

BACKGROUND

1. Technical Field

The present invention relates to an image forming apparatus and an image forming method.

2. Related Art

Up to now, in a recording apparatus for obtaining a color image by means of an electrophotography method, fundamental three primary colors are developed corresponding to respective image information and toner images thereof are sequentially superposed to obtain a color image. Specific known apparatus configurations are: a so-called four-cycle unit in which for each color a single photoreceptor drum has a latent image formed thereon, according to an image forming method, developed and then transferred onto a transfer member, this cycle being repeated for each color to obtain a color image; and a tandem unit in which for each color image forming unit a photoreceptor drum and a developing apparatus are provided and a transfer member moves to sequentially and continuously transfer a toner image to obtain a color image is known.

These are common in at least the point that a plurality of developing apparatuses for the respective colors is provided. Accordingly, in ordinary color image formation, four developing apparatuses for use with the three primary colors and black are necessary. Furthermore, in the tandem unit, corresponding to the respective four developing apparatuses, four photoreceptor drums are necessary and means for synchronizing the four image forming units is necessary. Accordingly, it cannot be avoided that an apparatus becomes large in size and the cost increases.

SUMMARY

According to an aspect of the present invention, there is provided an image forming apparatus comprising: an image holding member; a toner image forming unit that forms a toner image on a surface of the image holding member; a color forming information applying unit that applies, with light, color forming information to the toner image formed on the surface of the image holding member; a transferring unit that transfers the toner image applied with the color forming information onto a surface of a recording medium; a fixing unit that fixes the toner image transferred onto the surface of the recording medium; a color forming unit that forms a color of the toner image applied with the color forming information; the toner being controlled by being applied with the color forming information with light so as to hold a state that can form a color or a state that cannot form a color; and the color forming information applying unit exposing, from a back surface side of the image holding member, the toner image formed on the surface of the image holding member to apply the color forming information to the toner image by light transmitted through the image holding member.

BRIEF DESCRIPTION OF THE DRAWINGS

Exemplary embodiments of the present invention will be described in detail based on the following figures, wherein.

DETAILED DESCRIPTION

Figure 1:
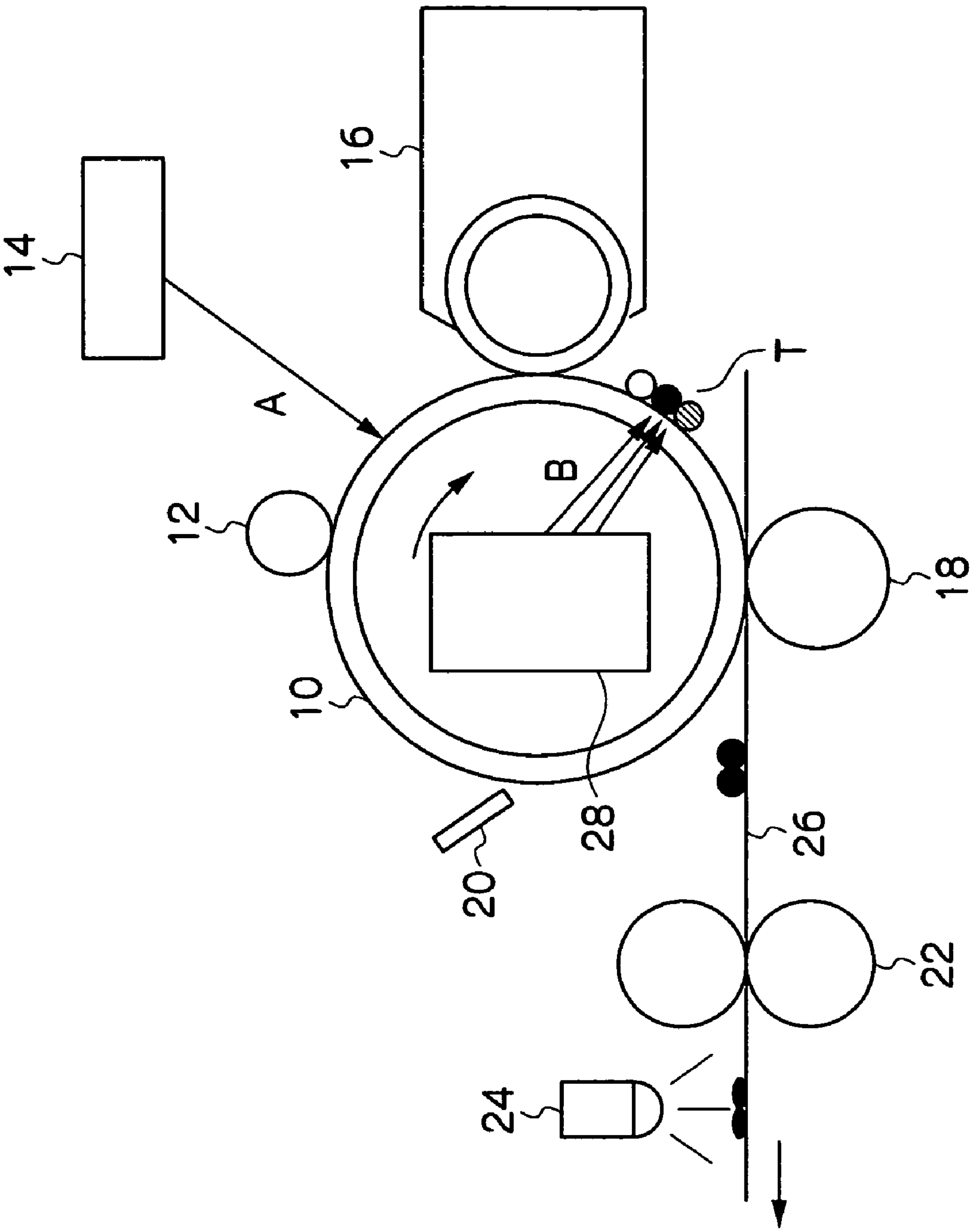
FIG. 1 is a schematic configurational diagram showing an example of an image forming apparatus of the present invention.
Figure 2A:
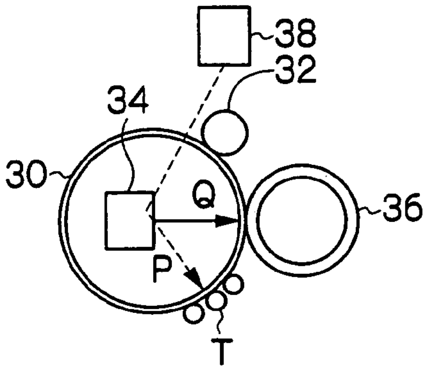
FIGS. 2A, 2B, 2C and 2D each are a schematic diagram showing one example of a configuration of latent image forming exposure and color forming information applying exposure, which shows a case where the sensitivity of a photoreceptor is in a color forming wavelength region, a color forming information applying unit is disposed outside of the photoreceptor and development is carried out simultaneously with the latent image forming exposure being shown, FIGS. 2A and 2B showing a configuration where the color forming information applying exposure is carried out after development, and FIGS. 2C and 2D showing a configuration where the development and the color forming information applying exposure are simultaneously carried out.
Figure 2B:
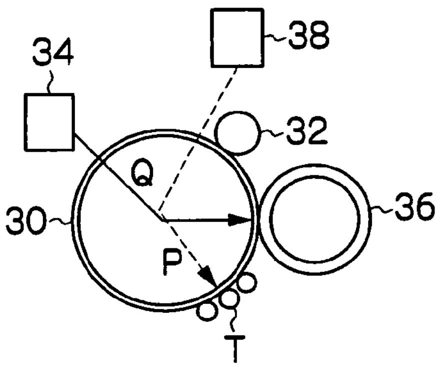
Figure 2C:
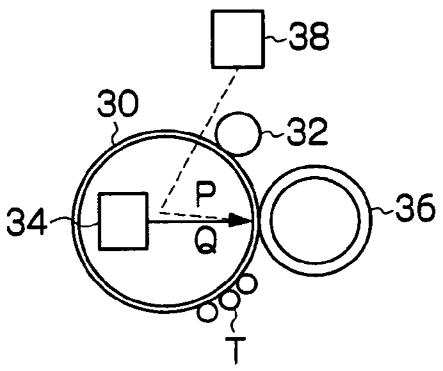
Figure 2D:
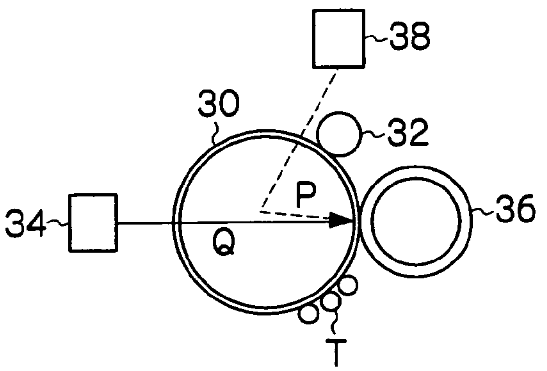
Figure 3A:
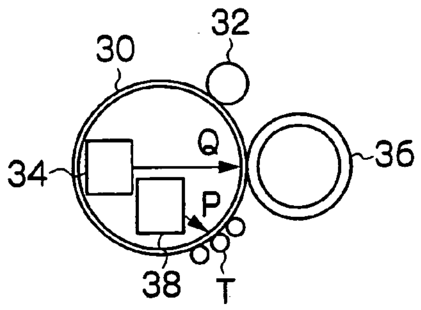
FIGS. 3A, 3B, 3C and 3D each are a schematic diagram showing another example of a configuration of latent image forming exposure and color forming information applying exposure, which shows a case where the sensitivity of a photoreceptor is in a color forming wavelength region, a color forming information applying unit is disposed inside of the photoreceptor and development is carried out simultaneously with the latent image forming exposure, FIGS. 3A and 3B showing a configuration where the color forming information applying exposure is carried out after development, and FIGS. 3C and 3D showing a configuration where the development and the color forming information applying exposure are simultaneously carried out.
Figure 3B:
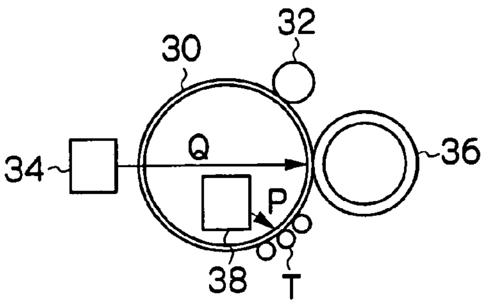
Figure 3C:
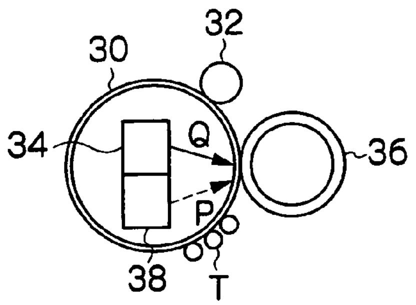
Figure 3D:
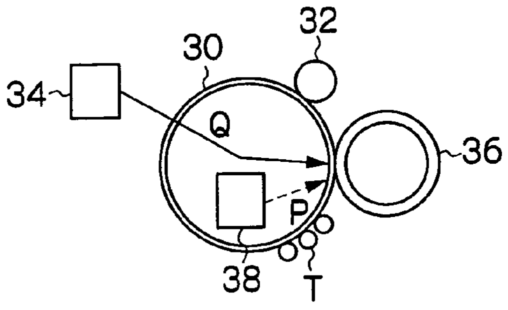
Figure 4A:
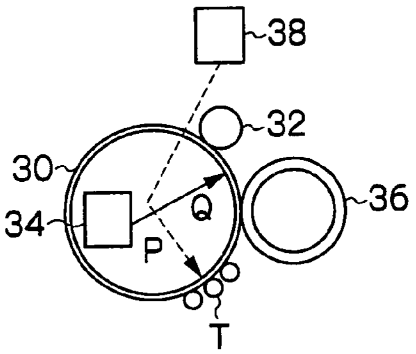
FIGS. 4A, 4B, 4C and 4D each are a schematic diagram showing still another example of a configuration of latent image forming exposure and color forming information applying exposure, which shows a case where the sensitivity of a photoreceptor is in a color forming wavelength region, a color forming information applying unit is disposed outside of the photoreceptor and development is carried out after the latent image forming exposure, FIGS. 4A and 4B showing a configuration where the color forming information applying exposure is carried out after development, and FIGS. 4C and 4D showing a configuration where the development and the color forming information applying exposure are simultaneously carried out.
Figure 4B:
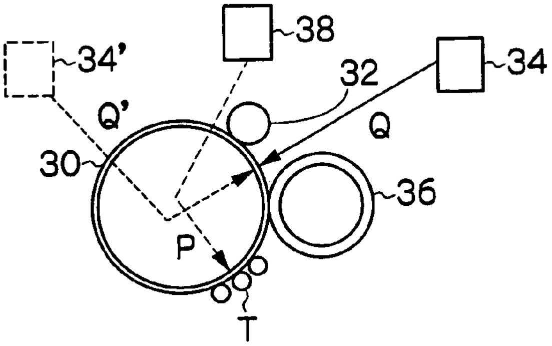
Figure 4C:
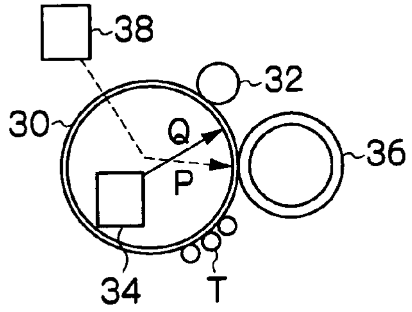
Figure 4D:
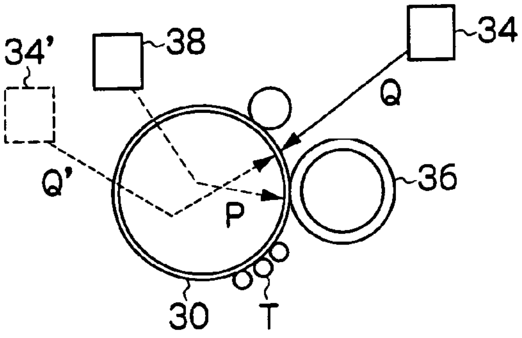
Figure 5A:
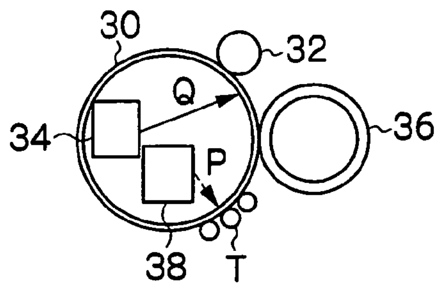
FIGS. 5A, 5B, 5C and 5D each are a schematic diagram showing another example of a configuration of latent image forming exposure and color forming information applying exposure, which shows a case where the sensitivity of a photoreceptor is in a color forming wavelength region, a color forming information applying unit is disposed inside of the photoreceptor and development is carried out after the latent image forming exposure, FIGS. 5A and 5B showing a configuration where the color forming information applying exposure is carried out after development, and FIGS. 5C and 5D showing a configuration where the development and the color forming information applying exposure are simultaneously carried out.
Figure 5B:
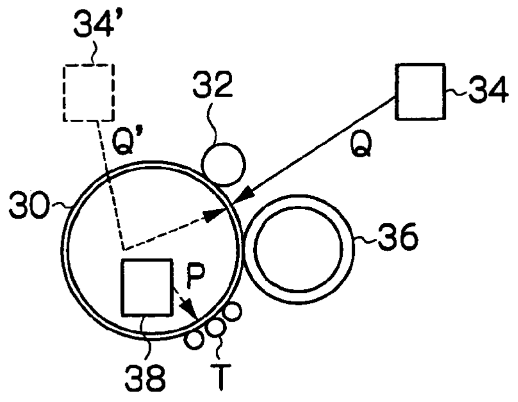
Figure 5C:
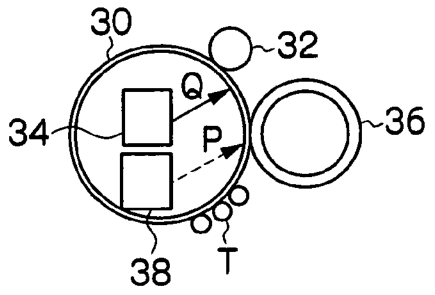
Figure 5D:
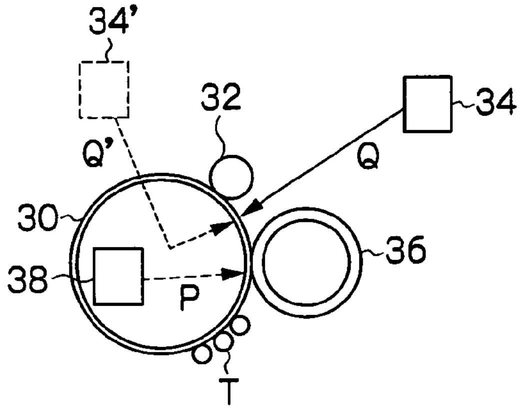
Figure 6A:
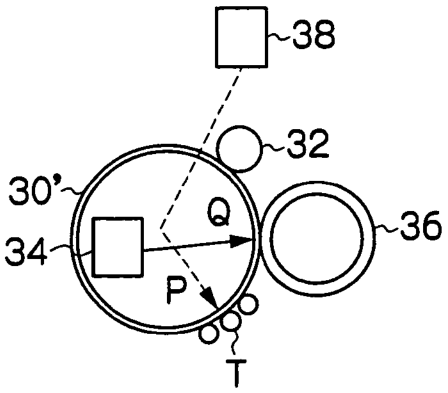
FIGS. 6A, 6B, 6C and 6D each are a schematic diagram showing still another example of a configuration of latent image forming exposure and color forming information applying exposure, which shows a case where the sensitivity of a photoreceptor is not in a color forming wavelength region, a color forming information applying unit is disposed outside of the photoreceptor and development is carried out simultaneously with the latent image forming exposure, FIGS. 6A and 6B showing a configuration where the color forming information applying exposure is carried out after development, and FIGS. 6C and 6D showing a configuration where the development and the color forming information applying exposure are simultaneously carried out.
Figure 6B:
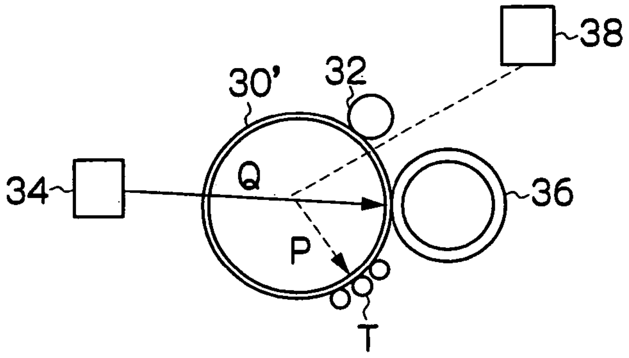
Figure 6C:
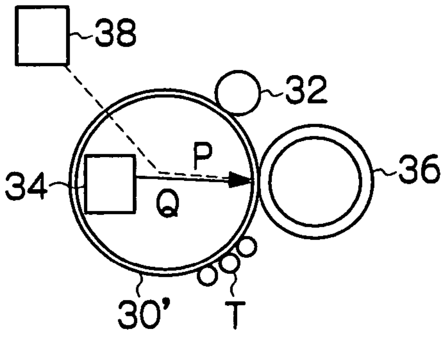
Figure 6D:
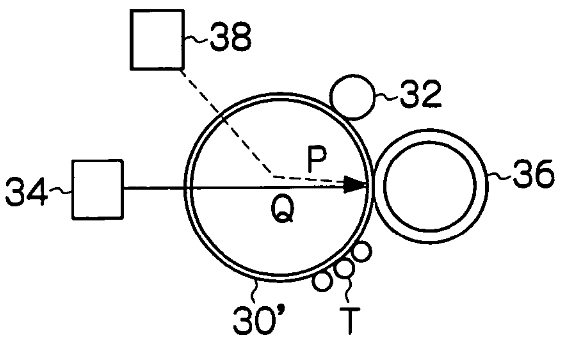
Figure 7A:
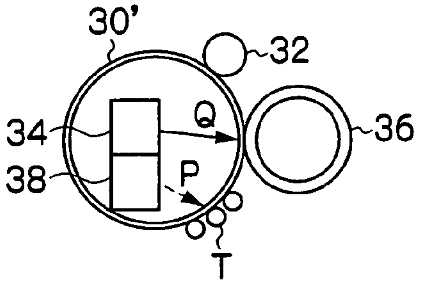
FIGS. 7A, 7B, 7C and 7D each are a schematic diagram showing another example of a configuration of latent image forming exposure and color forming information applying exposure, which shows a case where the sensitivity of a photoreceptor is not in a color forming wavelength region, a color forming information applying unit is disposed inside of the photoreceptor and development is carried out simultaneously with the latent image forming exposure, FIGS. 7A and 7B showing a configuration where the color forming information applying exposure is carried out after development, and FIGS. 7C and 7D showing a configuration where the development and the color forming information applying exposure are simultaneously carried out.
Figure 7B:
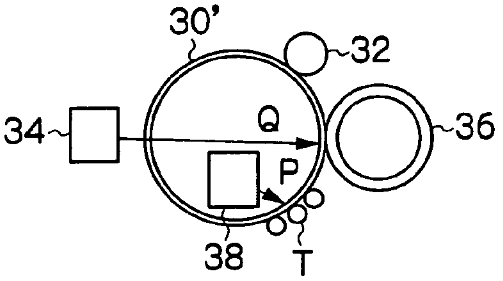
Figure 7C:
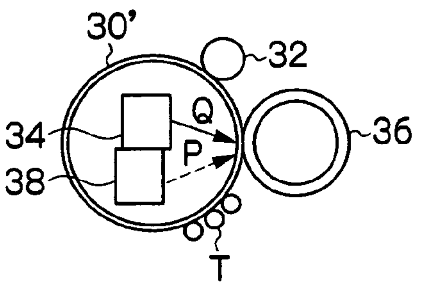
Figure 7D:
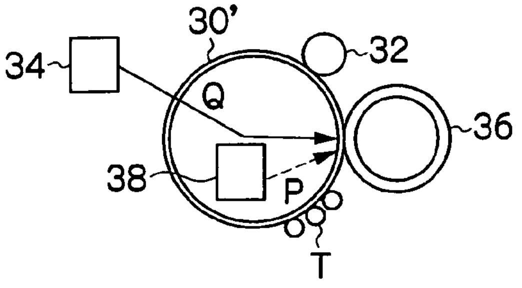

Hereunder is a detailed description of an aspect of the present invention.

An image forming apparatus (image forming method) according to the aspect of the invention is an image forming apparatus (image forming method) that uses a toner that can be controlled, by applying color forming information with light, so as to maintain a state of color forming or non-color forming, the image forming unit including: an image holding member; a toner image forming unit that forms a toner image on a surface of the image holding member (toner image forming step); a color forming information applying unit that applies with light color forming information to the toner image formed on the surface of the image holding member (color forming information applying step); a transferring unit that transfers the toner image applied with the color forming information onto a surface of a recording medium (transferring step); a fixing unit that r fixes the toner image transferred on the surface of the recording medium(fixing step); and a color forming unit that forms a color of the toner image applied with the color forming information (color forming step), the color information applying unit (color forming information applying step) exposing, from a back surface side of the image holding member, with light transmitted through the image holding member, the toner image formed on the surface of the image holding member to apply the color forming information to the toner image.

The toner used in the aspect of the invention has a function of, when for instance individual particles of the toner are exposed with lights with different wavelengths, maintaining a state that colors corresponding to the wavelengths or does not color (non-color forming). That is, the toner has inside thereof a color forming substance (furthermore, a color forming portion including this) capable of color forming when color forming information is applied with light and thereby when the color forming information is applied with the light the toner is controlled so as to maintain a color forming or non-color forming state.

Here, the "applying color forming information with light" means that, in order to control a color forming/non-color forming state or a tone at the color forming at the unit of individual toner particles that constitute the toner image, light having one kind or more of particular wavelength or none of light is selectively applied to a desired region of the toner image.

Such toners, as far as these can exert the function, are not particularly restricted. For instance, toners described in JP-A Nos. 63-311364 and 2003-330228, and a toner that is preferably used in the aspect of the invention and described below can be cited.

In an image forming apparatus (image forming method) that uses the toner, the toner like this is mounted on one developing unit, an electrostatic latent image is formed on an image holding member according to a logical sum of image forming information of four colors of cyan (C), magenta (M), yellow (Y) and black (K), the electrostatic latent image is developed as the toner image with the toner, and, for instance, thereafter, the toner image is exposed with light having a wavelength corresponding to color information to apply color forming information to the toner image. Thereafter, the toner image applied with the color forming information is transferred on a recording medium, followed by fixing on the recording medium by heating under pressure. At this time, the heat causes a color forming reaction of the toner to obtain a color image.

Accordingly, since a full color image can be obtained with one image holding member and one developing unit, a magnitude of an image forming apparatus body limitlessly approaches a magnitude of a monochromatic printer and thereby the miniaturization of the apparatus can be realized. In addition to this, at the time of forming the toner image, since there is no need of layering a toner for every color, an image surface can be inhibited from being formed irregularly, thereby the gloss of the image surface can be made homogeneous, and, furthermore, since a color forming agent such as a pigment is not used in the toner, a silver salt-like image can be obtained.

As mentioned above, in an existing image forming apparatus that uses a toner similar to the above one, color forming information is applied from a surface side of an image holding member. Accordingly, since color forming light is difficult to reach, for instance, a lower layer portion of the toner developed in a multilayer, in some cases, sufficient color forming cannot be obtained. As a result, in some cases, a color in the image may be one different from desired one.

In the aspect of the invention, it was found that when exposure for applying color forming information is applied from a back surface (a surface on a side opposite to a side where a toner image is formed) of the image holding member, the above problems could be overcome.

That is, in the aspect of the invention, it was found that, since exposure (hereinafter, in some cases, referred to as "color forming information applying light") for applying color forming information is applied from a back surface of the image holding member and light transmitted through the image holding member is irradiated on the toner, when the light transmits through the image holding member, scattering is caused owing to interfaces of the respective layers forming the image holding member, incidence angles and internal impurities to expand light when exiting from a surface of the image holding member, and thereby light can be impinged with a multitude of angles onto a surface of the toner. As a result, reflection on the toner surface is promoted, light can uniformly irradiate gaps between toner images developed in a multilayer to color the toner excellently, and thereby a color reproduction region in an image can be expanded.

Furthermore, when the image holding member is exposed from a back surface (rear surface), in the case of an exposure apparatus for applying color forming information being disposed in the vicinity of a developed toner image (in particular, a case where the exposure apparatus is disposed in the proximity of the image holding member like a LED image bar), the toner image can be advantageously inhibited from spattering to contaminate the exposure apparatus.

The image forming process to which the aspect of the invention is applied may be, without particularly restricting, a so-called electrophotography process, a process where an electrostatic latent image is formed on a dielectrics with an ion (ionography), or, a process where, on a uniformly charged dielectrics, an electrostatic latent image is formed corresponding to image information with heat of a thermal head, furthermore, a process that does not use an electrostatic latent image but forms, for instance, a magnetic latent image to form a toner image, or a process where an adhesive ink drop is formed corresponding to image information on the image holding member to form a toner image.

In the beginning, an image forming apparatus (image forming method) to which the aspect of the invention is applied and in which a color image is formed owing to an electrophotography process that uses a toner capable of controlling a color forming or non-color forming state corresponding to color forming information with light will be briefly described.

An image forming apparatus that uses the ionography, being different only in a step of forming a toner image described later and same in the other steps, will be described appropriately in combination.

FIG. 1 is a schematic configurational diagram showing one example of an image forming apparatus of the aspect of the invention. The image forming apparatus shown in FIG. 1 includes a photoreceptor (image holding member) 10 used in an ordinary electrophotography process, an electrifying apparatus (charging means) 12, an exposing apparatus (exposing means) 14, a developing apparatus (developing means) 16, a transfer apparatus (transferring means) 18 and a fixing apparatus (fixing means) 22. Furthermore, in the apparatus, a color forming information applying apparatus 28 that applies color forming information from a back surface of the photoreceptor 10 to a developed toner image is disposed and the fixing apparatus 22 combines a color forming apparatus (color forming means) that colors the toner image. Still furthermore, on a downstream side of the fixing apparatus 22, an illuminating apparatus 24 (illuminating means) for illuminating light to a recording medium 26 to solidify the color forming of the toner is disposed. A reference numeral 20 shows a cleaner.

In what follows, a configuration of the image forming apparatus of the aspect of the invention will be described along the respective steps in image formation.

<Toner Image Formation Step>

When an image holding member such as shown in FIG. 1 is a photoreceptor 10, the toner image forming step includes a charging apparatus 12 for charging a surface of the photoreceptor, an exposing apparatus 14 for exposing a surface of the photoreceptor to form an electrostatic latent image thereon and a developing apparatus 16 for rendering the electrostatic latent image a toner image with a developer containing the toner.

Firstly, an entire surface of the photoreceptor 10 is charged with the charging apparatus 12.

As the photoreceptor 10, as far as it can transmit exposing light from the color forming information applying unit 20 described later, any one can be used. However, a transparent photoreceptor is preferably used. Here, the term "transparent" means that the transmittance of exit light to incident light (exit light/incident light) is 50% or more in a wavelength region used.

A transparent photoreceptor is formed with a photosensitive layer disposed on a surface of a transparent base material such as glass or plastics. A thickness of the base material is determined from necessary mechanical strength and preferably substantially in the range of 0.1 to 5 mm. A transparent electrode is preferably disposed on the transparent base material. As the transparent electrode, one in which fine particles of a metal oxide such as ITO or $SnO_2$ are mixed with a binder resin or one where a conductive polymer such as polypyrrole is coated can be used. A thickness of the transparent electrode is determined from necessary conductivity and the transmittance and preferably substantially in the range of 0.01 to 10 μm.

As the photosensitive layer, for instance, a photosensitive layer of an inorganic material such as Se and a-Si, or an organic photosensitive layer of a single layer or multilayer (charge generating layer and charge transport layer) can be cited. Furthermore, in order to more frequently scatter the incident light, a metal oxide or organic particles such as fluororesin particles having a diameter in the range of several tens nanometers to several micrometers are preferably dispersed in the photosensitive layer.

However, since it is necessary as mentioned above for light to transmit the photosensitive layer to expose the toner, light transmissive one is preferable. As a measure of the transmittance, the transmittance of the photosensitive layer itself is preferably 50% or more and more preferably 70% or more.

Furthermore, since exposure for applying color forming information, which will be described later, is applied at a rather stronger intensity than that of the exposure for forming an ordinary latent image (an energy amount of light supplied to apply color forming information is necessary substantially 1000 times an exposure amount (2 mJ/$m^2$) of a photoreceptor used in an ordinary electrophotography process), there is concern that the photoreceptor 10 may be damaged. However, when the light sensitivity of a charge generating layer of the photoreceptor 10 is set at one thousandth existing light sensitivity, since a balance is established, there is no problem.

A thickness of the photosensitive layer is determined from the transparency and the insulating property that can withstand a charging potential considering the film thinning with time and preferably substantially in the range of 5 to 50 μm.

Furthermore, in the case of a belt-like photoreceptor, as a transparent base material, a transparent resin such as PET or PC can be used. A thickness thereof is determined from design matters such as a diameter of a roll that stretches the belt-like photoreceptor and tension and substantially in the range of 10 to 500 μm. Other layer configuration and so on are same as a case of the drum.

On the other hand, in the case of a toner image being formed by means of the ionography, in place of the photoreceptor 10, dielectrics are used. As the dielectrics as well, from the similar reason, transparent dielectrics are preferably used.

As the transparent dielectrics, in place of the photosensitive layer in the transparent photoreceptor, a transparent dielectric layer, for instance, one that uses transparent plastics such as PET or PC can be used.

A known charging means can be used to charge the photoreceptor 10. When it is a contact type, a roll, brush, magnetic brush or blade can be used, and, when it is a non-contact type, a corotron or scorotron can be used. The charging means is not restricted thereto.

Among these, from a balance between the charging compensation capability and an ozone generation amount, a contact charging unit is preferably used. In the contact charging method, a voltage is applied to a conductive member in contact with a surface of the photoreceptor to charge the surface of the photoreceptor. A shape of the conductive member may be any one of a brush shape, a blade shape, a pin-electrode shape or a roll shape. However, a roll-shaped member is particularly preferable. Normally, a roll-shaped member is constituted from the outside of a resistance layer, an elastic layer that supports these and a core material. Furthermore, as needs arise, a protective layer may be disposed outside of the resistance layer.

As a method of charging the photoreceptor 10 with the conductive member, a voltage is applied to the conductive member. A voltage applied is preferably a direct current voltage or one in which an alternating current voltage is superposed on a direct current voltage is preferable. As a range of the voltage, in the case of a direct current alone being used to charge, a positive or negative voltage substantially of a surface potential 500 V in an absolute value is preferable. A value thereof is in the range of 700 to 1500 V. When the alternating current voltage is superposed, a direct current value thereof is set to substantially a surface potential ±50 V, a peak-to peak voltage (Vpp) of the alternating current is set in the range of 400 to 1800 V, preferably in the range of 800 to 1600 V, a frequency of an alternating current voltage is set in the range of 50 to 20000 Hz, preferably in the range of 100 to 5000 Hz, and any one of a sinusoidal wave, a rectangular wave and a triangular wave can be used.

A charging potential is preferably set in the range of 150 to 700 V by an absolute value of a potential.

A known exposing apparatus 14 can be used to form an electrostatic latent image. As the exposing apparatus 14, for instance, a laser scanning system, an LED image bar system, an analog exposing means and an ion current control head can be used to expose a surface of the photoreceptor 10 like an arrow mark A in FIG. 1. Other than the above, a novel exposing means that will be developed in future, as far as it can serve achieving an advantage of the aspect of the invention, can be used.

A wavelength of a light source in the spectral sensitivity region of the photoreceptor 10 can be used. So far, a near infrared beam having an oscillation wavelength in the proximity of 780 nm is a mainstream as a wavelength of a semiconductor laser. However, a laser having an oscillation wavelength in the 600 nm or a laser having an oscillation wavelength in the proximity in the range of 400 to 450 nm as a blue laser can be used as well. Furthermore, in order to form a color image, a plane emission type laser light source capable of outputting multi-beams is effective as well.

The exposure of the photoreceptor 10 is applied, in the case of reversal development, to a position where the toner is developed, which will be described later, and, in the case of normal development, to a position other than a position where the toner is developed, as a logical sum of image forming information of the four colors. An exposure spot diameter is preferably set in the range of 40 to 80 μm so that the resolution may be in the range of 600 to 1200 dpi. An exposure amount is preferably set so that a potential after exposure may be substantially in the range of 5 to 30% of the charging potential. However, when a development amount of the toner is varied corresponding to the gradation of an image, an exposure amount may be varied corresponding to a developed amount for every exposure position.

On the other hand, in the case of the ionography, by use of an ion writing head, a latent image is formed on the image holding member. As the ion writing head, for instance, one in which an ion current is on/off controlled with an image signal (JP-A No. 4-122654) or one in which a generation of an ion current itself is on/off controlled (JP-A No. 6-99610) can be used.

In the case of the method, as the image holding member, not only the dielectrics but also the photoreceptor can be used.

When the electrostatic latent image is developed, a known developing apparatus 16 can be used. As a developing method, a two-component developing method that uses a fine magnetic particle for carrying a toner, which is called a carrier, and a toner, or a single component development method that uses only a toner, or all development methods where, in the above development methods, in order to improve the development and other characteristics, separate constituent substances may be further added can be used.

Furthermore, depending on the development method, the photoreceptor 10 may be developed in contact or in no contact with the developer or in a combination thereof. Furthermore, a hybrid development method that combines the single-component development method and the two-component development method can be used as well. Other than the above, a novel developing mean that will be developed in future, as far as it can serve achieving an advantage of the aspect of the invention, can be used.

As the toner that is contained in the developer, for instance, it may be one that contains a color forming portion capable of color forming in Y color (Y color forming portion), a color forming portion capable of color forming in M color (M color forming portion) and a color forming portion capable of color forming in C color (C color forming portion) in one toner particle or one that separately contains the Y-color forming portion, M color forming portion and C color forming portion in separate toners.

A toner developing amount (a toner amount adhered to the photoreceptor) is set, though different depending on an image formed, in the case of a solid image, preferably in the range of 3.5 to 8.0 g/$m^2$ and more preferably in the range of 4.0 to 6.0 g/$m^2$.

Furthermore, in a formed toner image T, light for applying color forming information, which will be described later, has to prevail over an entirety of an illuminated portion; accordingly, a toner layer thickness is preferably suppressed to a constant value or less. Specifically, for instance, in the solid image, the toner layer is preferably three-layers or less and more preferably two-layers or less. The toner layer thickness is a value obtained by measuring a thickness of a toner layer formed on a surface of an actual photoreceptor 10 followed by dividing by a number average particle diameter of the toner.

<Step of Applying Color Forming Information>

In the next place, to thus obtained toner image T, as shown in FIG. 1, a color forming information applying unit 28 applies color forming information with light as shown with an arrow mark B from a back surface of the photoreceptor 10. A position of a color forming information applying step shown in FIG. 1 is an example, and, as will be described later, the color forming information applying step may be carried out simultaneously with the development step.

In the aspect of the invention, the color forming information applying exposure is carried out from a back surface of the photoreceptor 10. Accordingly, for instance, when light transmits through the transparent photosensitive layer, scattering is caused at interfaces of the respective layers and incident angles and by impurities in the photoreceptor; as a result, light expands when exiting from a surface of the transparent photoreceptor, and, in comparison with a case where light does not expand, light can be illuminated from more angles to the toner surface. Accordingly, absorption and reflection on the toner surface are promoted, and thereby gaps between toners multi-layer developed can be thoroughly illuminated. At this time, owing to the scattering, the resolving power is a little sacrificed; however, this is not a level that causes a problem.

The color forming information applying unit 28, as far as it can illuminate light having a wavelength for color forming a toner particle that is colored at that time in a particular color with predetermined resolution and the intensity, may be any one. For instance, an LED image bar or a laser ROS can be used. An illumination spot diameter of light illuminated on the toner image T is controlled preferably in the range of 10 to 300 μm and more preferably in the range of 20 to 200 μm so that the resolution of a formed image may be in the range of 100 to 2400 dpi.

A wavelength of light supplied to maintain a color forming or non-color forming state is determined depending on material design of the toner used. For instance, when a toner that is colored when light having a particular wavelength is illuminated (photo-color forming type toner) is used, 405 nm light (called $\lambda_A$ light) is illuminated when the toner is colored in yellow (Y color), 535 nm light (called $\lambda_B$ light) is illuminated when the toner is colored in magenta (M color) and 657 nm light (called $\lambda_C$ light) is illuminated when the toner is colored in cyan (C color), respectively, on positions desired to color.

Furthermore, when the toner is colored in a secondary color, combinations of the above lights are used. That is, when the toner is colored in red (R color), the $\lambda_A$ light and the $\lambda_B$ light are illuminated, when it is colored in green (G color), the $\lambda_A$ light and the $\lambda_C$ light are illuminated, and, when it is colored in blue (B color), the $\lambda_B$ light and the $\lambda_C$ light are illuminated, respectively, on positions desired to be colored.

Still furthermore, when black (K color) that is a ternary color is colored, the $\lambda_A$ light, the $\lambda_B$ light and the $\lambda_C$ light are superposed and illuminated on a position desired to color.

On the other hand, in the case of a toner that maintains a non-color forming state by illuminating a particular wavelength light (photo-non-color forming toner), for instance, when yellow (Y color) is made not colored, 405 nm light ($\lambda_A$ light) is illuminated, when magenta (M color) is made not colored, 535 nm light ($\lambda_B$ light) is illuminated and, when cyan (C color) is made not colored, 657 nm light ($\lambda_C$ light) is illuminated, respectively, on positions that are desired to color. Accordingly, when the Y color is made colored, the $\lambda_B$ light and the $\lambda_C$ light are illuminated, when the M color is made colored, the $\lambda_B$ light and the $\lambda_C$ light are illuminated, and, when the C color is made colored, $\lambda_A$ light and the $\lambda_B$ light are illuminated, respectively, on positions desired to color.

Furthermore, when the toner is colored in a secondary color, a combination of above lights is used. When the toner is colored in red (R color), the $\lambda_C$ light is illuminated, when the toner is colored in green (G color), the $\lambda_B$ light is illuminated, and when the toner is colored in blue (B color), the $\lambda_A$ light is illuminated, respectively, on positions that are desired to color. Still furthermore, when black (K color) that is a ternary color is colored, a position desired to color is not exposed.

Light from the color forming information applying unit 28, as needs arise, can be subjected to a known image modulation method such as a pulse width modulation, an intensity modulation or a combination thereof An exposure amount of the light is preferably set in the range from 0.05 to 0.8 mJ/$cm^2$ and more preferably in the range of 0.1 to 0.6 mJ/$cm^2$. In particular, as to the exposure amount, a necessary exposure amount is correlated with an amount of developed toner. For instance, when an amount of developed toner (solid) is substantially 5.5 g/$m^2$, the exposure is preferably applied in the range from 0.2 to 0.4 mJ/$m^2$.

In the aspect of the invention, in the case of a transparent photoreceptor being used as an image holding member, depending on a sensitivity wavelength region of the transparent photoreceptor, relationship between latent image formation and development, an arrangement of a color forming information applying unit, a position for illuminating exposing light with the color forming information applying unit and an arrangement of an exposing mean for forming a latent image, various configurations can be adopted.

The respective modes thereof are schematically shown in FIGS. 2 through 9. In the drawings, in the circumference of a transparent photoreceptor 30 or 30', a charging apparatus 32 and a developing apparatus 36, respectively, are disposed. Latent image formation is applied with exposing light (hereinafter, in some cases, referred to as "latent image forming light") of which optical path owing to the exposing apparatus 34 or 34' is shown with an arrow mark Q or Q' in the drawing, and, after development (or simultaneously with the development), with exposing light (hereinafter, in some cases, referred to as "color forming information applying light") of which optical path owing to the color forming information applying unit 38 is shown with an arrow mark P in the drawing, color forming information is applied. In these, an arrow mark in the transparent photoreceptor 30 or 30' being deflected shows a state where an optical path is changed by reflecting incident light with a mirror. A reference sign T shows a toner image.

Furthermore, in the respective drawings, A and B show configurations where after the development color forming information applying exposure is applied, and C and D show configurations where development and color forming information applying exposure are simultaneously applied. Among these, A and C show configurations where an exposing apparatus 34 for forming a latent image is disposed inside of the transparent photoreceptor 30 or 30' and B and D show configurations where the exposing unit 34 is disposed outside of the transparent photoreceptor 30 or 30'.

In the beginning, as to a sensitivity wavelength region of a transparent photoreceptor used, depending on whether (1) the photoreceptor has effective sensitivity in a wavelength region (hereinafter, referred to as "color forming wavelength region") for color forming the toner (or maintaining a non-color forming state) or (2) the photoreceptor does not have effective sensitivity in the color forming wavelength region, configurations are classified. The respective configurations shown in FIGS. 2 through 5 belong to the category (1) and configurations shown in FIGS. 6 through 9 belong to the category (2).

Furthermore, as to an arrangement of a color forming information applying unit, depending on whether (3) the color forming information applying unit is disposed outside of the transparent photoreceptor or (4) the color forming information applying unit is disposed inside of the transparent photoreceptor, configurations are classified. The respective configurations shown in FIGS. 2, 4, 6 and 8 belong to a category (3) and the respective configurations shown in FIGS. 3, 5, 7 and 9 belong to a category (4).

The relationship between the latent image formation and the development is classified depending on whether (5) the latent image forming exposure and the development are simultaneously applied or (6) the development is applied after the latent image forming exposure. FIGS. 2, 3, 6 and 7 belong to a category (5) and FIGS. 4, 5, 8 and 9 belong to a category (6).

In the case of the transparent photoreceptor 30 having the sensitivity in a color forming wavelength region (FIGS. 2 through 5), when the color forming information applying unit 38 is disposed outside of the transparent photoreceptor 30, color forming information applying light has to transect the transparent photoreceptor 30 at an upstream of the charging apparatus 32 that charges a surface of the transparent photoreceptor 30 (FIGS. 2 and 4). On the other hand, when the transparent photoreceptor 30' does not have the sensitivity in the color forming wavelength region (FIGS. 6 through 9), since the above restriction is lifted, there is an advantage in that a layout disposition becomes free (FIGS. 6 and 8).

In order to make that the transparent photoreceptor may not have the sensitivity in the color forming wavelength region (transparent receptor 30'), a material that does not generate charges upon reacting to the wavelength is preferably selected or a filter layer is preferably disposed on a front surface side and/or a back surface side of a substrate of the photoreceptor. As the filter layer, when a wavelength of the color forming information applying light is set, for instance, substantially in the range of 400 to 650 nm, one that has a function that transmits only light in the wavelength range and cuts light in a main absorption wavelength region (substantially in the range of 750 to 800 nm) is used. As a material constituting such a filter layer, an organic or inorganic thin film can be cited.

When the latent image forming exposure and the development are simultaneously carried out, the exposure is carried out in a development nip, and a latent image formed until going through the development nip is developed. In this case, though a photoreceptor short in the transit time such as a-Si becomes necessary (FIGS. 2, 3, 6 and 7), when combined with a configuration (C and D) where the development is simultaneously applied with the color forming information applying exposure, an exposure position becomes one; accordingly, an apparatus can be miniaturized (C and D of FIGS. 2, 3, 6 and 7). On the other hand, when the development is carried out after the latent image forming exposure, these are ordinary latent image formation and development processes (FIGS. 4, 5, 8 and 9).

As to the arrangement of the color forming information applying unit 38, in the case of the color forming information applying unit being disposed outside of the transparent photoreceptor 30, when the transparent photoreceptor 30 has the sensitivity in the color forming wavelength region, the above-mentioned restriction is generated (FIGS. 2 and 4). On the other hand, when it is disposed inside of the transparent photoreceptor 30, there is an advantage in that the color forming information applying unit 38 is not contaminated (FIGS. 3, 5, 7 and 9).

In the case of exposure of the color forming information applying light being applied after the development (A and B of the respective drawings), when the transparent photoreceptor 30 has the sensitivity in the color forming wavelength region, owing to positional displacement at the exposure time, blur (spattering of toner) may be caused (A and B in FIGS. 2 through 5). On the other hand, when the color forming information applying exposure and the development are simultaneously carried out (C and D of the respective drawings), the blur, being generated in the development nip, is hardly generated. Furthermore, when the latent image forming exposure and the development are simultaneously carried out, registration mismatch is hardly caused (C and D in FIGS. 2, 3, 6 and 7).

Still furthermore, when the exposing apparatus 34 is disposed inside of the transparent photoreceptor 30 or 30', the exposing apparatus 34 can be inhibited from being contaminated (A and C in the respective drawings). On the other hand, when the exposing unit 34 is disposed outside of the transparent photoreceptor 30 (B and D in the respective drawings), in a combination with a configuration where the development is carried out after the latent image forming exposure, although the latent image forming light can transect the transparent photoreceptor (B and D in FIGS. 4, 5, 8 and 9), the latent image forming light has to transect before the transparent photoreceptor is charged.

When the exposing apparatus 34 and the color forming information applying unit 38 are disposed outside of the transparent photoreceptor 30 or 30', an optical path can be formed straight or may be changed by disposing a reflection mean such as a mirror inside thereof. In a configuration where the exposing apparatus 34 is not disposed inside of the transparent photoreceptor 30 or 30' and only a reflection mean such as a mirror is disposed or neither the reflection mean is disposed (optical path is straight), when the toner image forming apparatus is formed into an exchange unit, since there is no need of disposing the exposing apparatus inside, electric wiring becomes unnecessary and thereby unitization can be readily carried out.

Furthermore, in relationship of a position where light transects the transparent photoreceptor 30 or 30' and a position where a cleaner is disposed, the cleaner is preferably disposed on an upstream side. When thus disposed, non-transferred residual toner can avoid from affecting adversely.

In the case of the exposing apparatus 34 and the color forming information applying unit 38 being disposed on the same side of the transparent photoreceptor 30 or 30', when these are formed into one chassis, since the exposing means containing an optical system can be partially formed in a common architecture and simplified, thereby miniaturization can be preferably realized.

From the above, from viewpoints of miniaturization of the apparatus and avoidance of the registration mismatch, a configuration where the latent image forming exposure and the color forming information applying exposure can be simultaneously carried out with the development is preferable (C and D in FIGS. 2, 3, 6 and 7). When attention is paid to the miniaturization of the apparatus, a configuration where the exposing apparatus and the color forming information applying unit are disposed inside of the transparent photoreceptor is more preferable (FIGS. 3C and 7C).

Figure 8A:
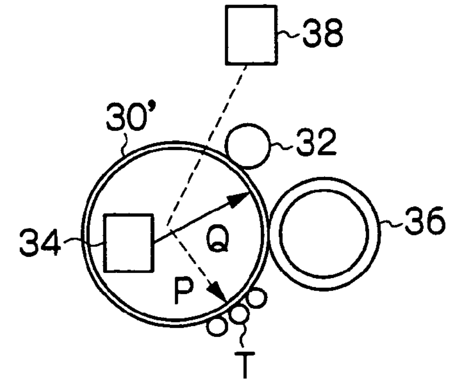
FIGS. 8A, 8B, 8C and 8D each are a schematic diagram showing still another example of a configuration of latent image forming exposure and color forming information applying exposure, which shows a case where the sensitivity of a photoreceptor is not in a color forming wavelength region, a color forming information applying unit is disposed outside of the photoreceptor and development is carried out after the latent image forming exposure, FIGS. 8A and 8B showing a configuration where the color forming information applying exposure is carried out after development, and FIGS. 8C and 8D showing a configuration where the development and the color forming information applying exposure are simultaneously carried out.
Figure 8B:
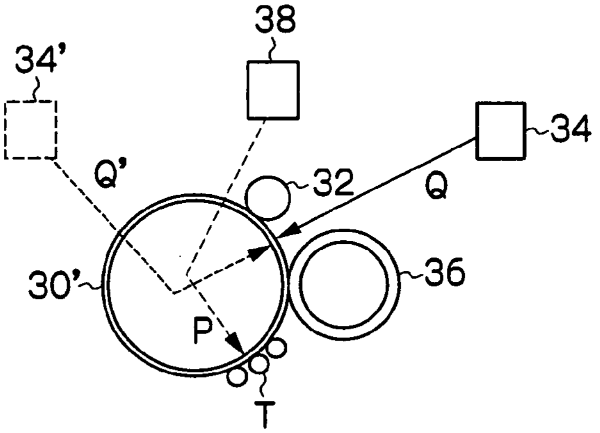
Figure 8C:
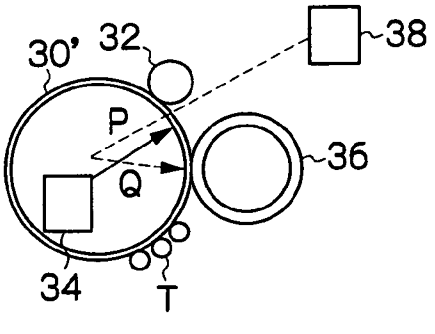
Figure 8D:
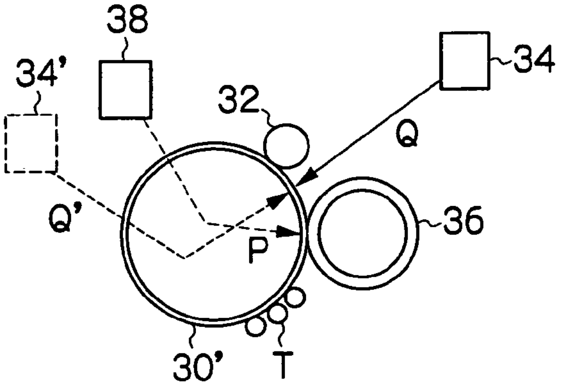
Figure 9A:
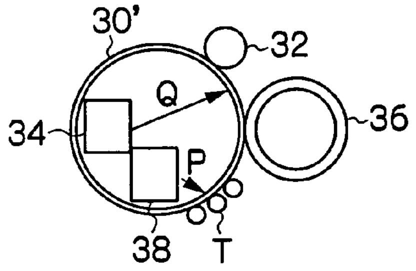
FIGS. 9A, 9B, 9C and 9D each are a schematic diagram showing one example of a configuration of latent image forming exposure and color forming information applying exposure, which shows a case where the sensitivity of a photoreceptor is not in a color forming wavelength region, a color forming information applying unit is disposed inside of the photoreceptor and development is carried out after the latent image forming exposure, FIGS. 9A and 9B showing a configuration where the color forming information applying exposure is carried out after development, and FIGS. 9C and 9D showing a configuration where the development and the color forming information applying exposure are simultaneously carried out.
Figure 9B:
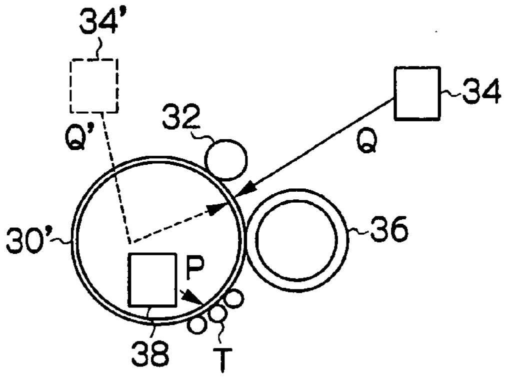
Figure 9C:
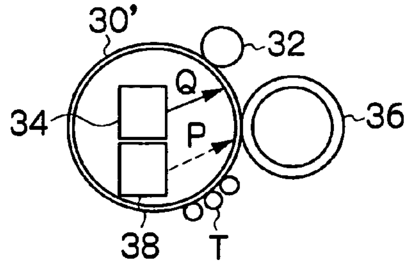
Figure 9D:
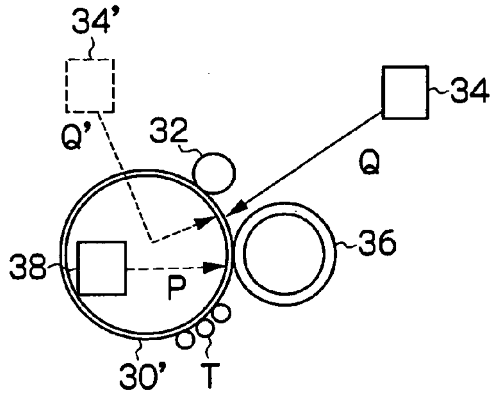
Figure 10A:
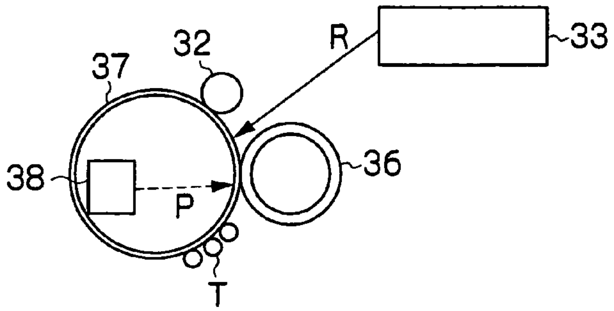
FIGS. 10A, 10B, 10C and 10D each are a schematic diagram showing one example of latent image forming ion writing and color forming information applying exposure, FIGS. 10A and 10B showing a configuration where the color forming information applying unit is disposed inside of a transparent dielectrics, and FIGS. 10C and 10D showing a configuration where the color forming information applying unit is disposed outside of the transparent dielectrics.
Figure 10B:
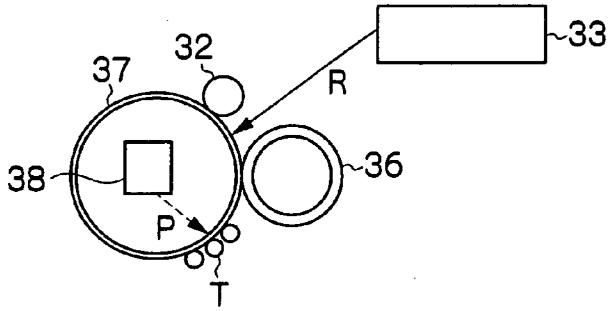
Figure 10C:
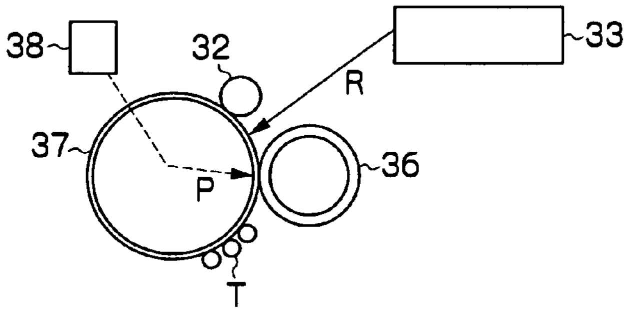
Figure 10D:
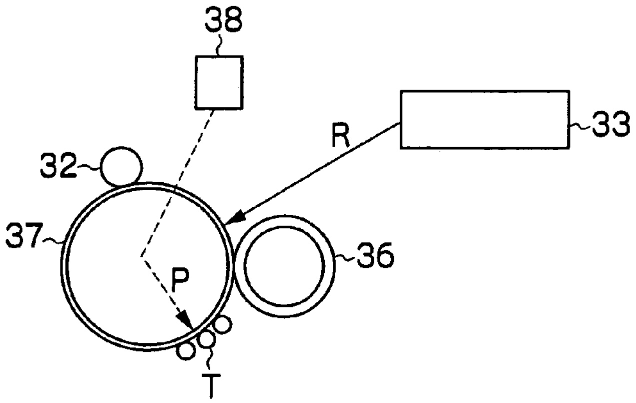

However, when considering avoidance of problems in apparatus design (less commonality with existing components and an increase in the number of novel components) and difficulty of an image formation process (less transplantability of parameters of the existing electrophotography process and less usability of know-how), configurations shown in FIGS. 8B and 8D, in which the color forming information applying exposure is applied after the development, are practically preferable configurations.

On the other hand, in FIGS. 10A through 10D, a configuration in the case of image formation due to the ionography, specifically, a configuration mode where a transparent dielectrics 37 as an image holding member and an ion writing head 33 for forming a latent image on the transparent dielectrics 37 are used is shown. In the drawing, A and B show configurations where the color forming information applying unit 38 is disposed inside of the transparent dielectrics 37 and C and D show configurations where the color forming information applying unit 38 is disposed outside of the transparent dielectrics 37. Furthermore, A and C show configurations where the development and the color forming information applying exposure are simultaneously carried out, and B and D show configurations where after the development the color forming information applying exposure is carried out.

An ion current due to the ion writing head 33 is shown with an arrow mark R in the drawings.

In this case, since the image holding member is the transparent dielectrics 37, the color forming information applying light can transect either of an upstream side and a downstream side of the charging unit 32. Furthermore, even when the color forming information applying light is strong, the transparent dielectrics 37 are advantageously not photo-deteriorated.

In the image formation due to the ionography, as mentioned above, as an image holding member, a transparent photoreceptor as well can be used. In that case, the configuration mentioned above is preferable configuration as it is. However, when the transparent dielectrics 37 are used, as mentioned above, a degree of freedom in design and the durability of the image holding member can be further improved.

In an apparatus configuration shown in FIG. 1, since color forming information is applied from only one side (back side) of the photoreceptor 10, color forming light may be difficult to reach an upper layer portion of a multilayer-developed toner and sufficient color forming may not be obtained. As a result, in some cases, a color in an image may be different from desired one. In this connection, in the aspect of the invention, on a front surface side of the photoreceptor 10 corresponding to a position exposed from a back surface side of the photoreceptor 10, a reflection mean that again reflects toward a toner image exposing light that applies color forming information to the toner image transmitted through the photoreceptor 10 is preferably disposed.

Figure 11:
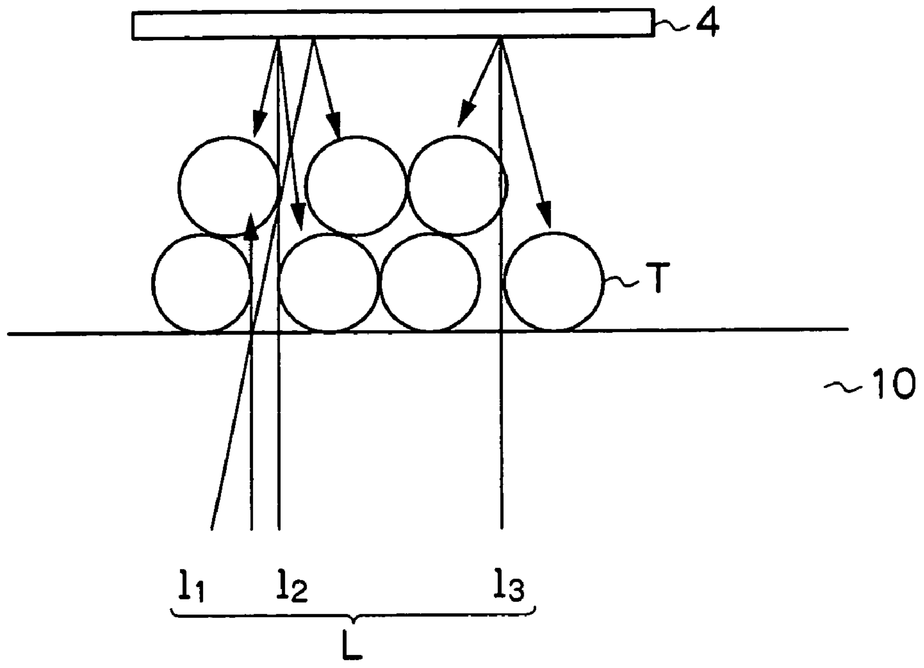
FIG. 11 is a schematic sectional view showing a state when color forming information is exposed to a toner image.

In FIG. 11, a cross section of the photoreceptor 10 that carries a toner image at the time of color forming information applying exposure is shown. However, in the case of a toner image (toner layer) T formed on the photoreceptor 10 being exposed with exposing light (arrow mark L in the drawing) for applying the color forming information, light substantially in the range of 10 to 50% goes externally through the toner itself and gaps of the toner layer. Accordingly, like $l_1$ through $l_3$ in the drawing, when light gone outside is reflected by a reflection means 4 on a front surface side of the photoreceptor 10 to again expose the toner, a multilayer-developed toner image T can be exposed from a top layer side in the drawing. Accordingly, sufficient color forming information applying exposure can be applied to the toner, resulting in obtaining sufficient color forming and obtaining a desired color in an image.

The reflection means 4 that reflects the exposing light, as far as it can reflect light transmitted through the toner layer, is not particularly restricted, and a mirror can be used. At this time, the reflection in the reflection means 4 as well, as shown in the drawing, is preferable to be diffuse scattering from a point of view of obtaining an advantage same as above. A distance between a surface of the photoreceptor 10 and the reflection means 4 is preferably set in the range of 0.05 to 5 mm. Furthermore, a surface of the reflection means 4 may be coated with transparent electric conductor to generate an electric field that does not disturb the toner image T.

The reflectance of the exposing light when the reflection means 4 is disposed is preferably set at 70% or more and more preferably at 90% or more.

In the case of the exposing light at that time being laser light, as to incidence of the laser beam to the photoreceptor, in order to inhibit light from returning to a monitor (Photo Detector) of the laser, ordinarily it is necessary to incline several degrees (4 to 13°). However, in the case of the color forming information applying exposure in the aspect of the invention, returning light is absorbed with the toner. Accordingly, since the returning light becomes extremely scarce, incidence at an arbitrary angle including 0° can be adopted.

In what follows, whether the color forming information applying exposure is applied at what timing and by what positional control will be briefly described.

Figure 12:
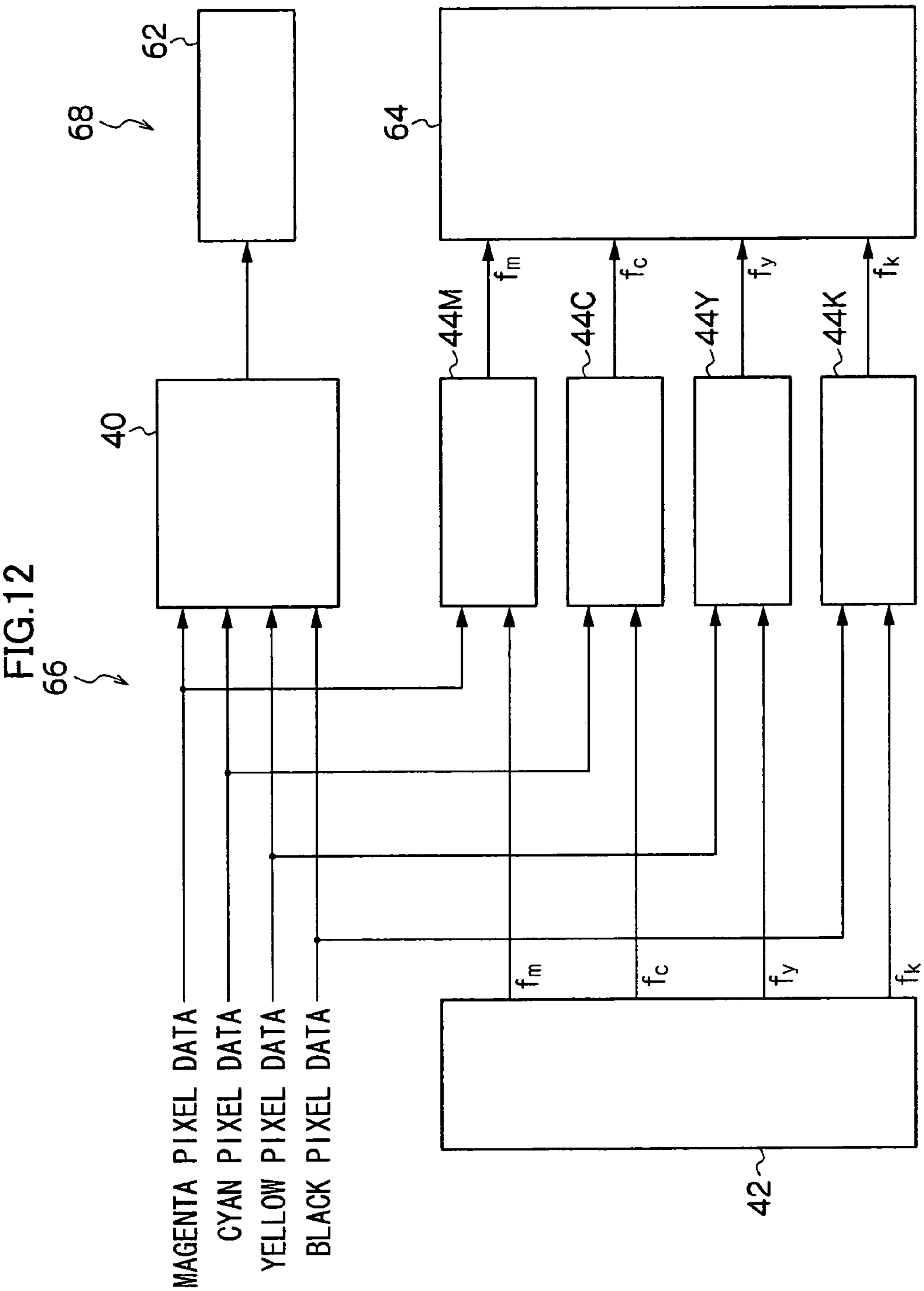
FIG. 12 is a circuit block diagram of a control portion.

FIG. 12 shows a specific circuit block diagram of a printing control portion in an image forming apparatus of the aspect of the invention. In the drawing, a printer controller 66 includes a logical sum circuit 40, an oscillation circuit 42, a magenta color forming controller circuit 44M, a cyan color forming controller circuit 44C, a yellow color forming controller circuit 44Y and a black color forming controller circuit 44K. On the other hand, an exposing portion 68 is constituted of an optical writing head 62 and a color forming information applying exposure head 64.

Image data obtained by converting inputted RGB signals to CMYK values with a not shown interface (I/F) are further outputted as pixel data of magenta (M), cyan (C), yellow (Y) and black (K) from the interface (I/F) to the logical sum circuit 40. Here, the logical sum circuit 40 calculates a logical sum of CMYK and outputs to the optical writing head 62.

That is, data of a logical sum containing pixel data of all CMYK are outputted to the optical writing head 62 to optically write in the photoreceptor 10 as mentioned above. Accordingly, on a circumferential surface of the photoreceptor 10, an electrostatic latent image based on the logical sum data containing pixel data of all CMYK is formed.

Furthermore, pixel data of CMYK are supplied as well to corresponding magenta color forming controller circuit 44M through black color forming controller circuit 44K and outputted to the color forming information applying exposure head 64 synchronized with oscillation signals fm, fc, fy and fk outputted from the oscillation circuit 42. That is, color forming data corresponding to each of magenta (M), cyan (C), yellow (Y) and black (K) are supplied to the color forming information applying exposure head 64 and thereby light having a particular wavelength is illuminated to maintain a color forming or non-color forming state corresponding to the toner image T developed on the photoreceptor 10. Accordingly, inside of the toner that has received illuminated light, a photo-curing reaction described later is caused to apply color forming information.

For instance, the color forming signal fm outputted from the magenta color forming controller circuit 44M illuminates the $\lambda_B$ light to a color forming portion in the toner to make the toner a state capable of color forming in a magenta (M) color. Furthermore, the color forming signal fc outputted from the cyan color forming controller circuit 44C illuminates the $\lambda_C$ light to a color forming portion in the toner to make the toner a state capable of color forming in a cyan (C) color. Still furthermore, the situation is similarly in the yellow (Y) and black (K) as well. That is, the color forming signals fy and fk outputted from the yellow color forming controller circuit 44Y and black color forming controller circuit 44K illuminate the $\lambda_A$ light, or the $\lambda_A$, $\lambda_B$ and $\lambda_C$ lights to a color forming portion in the toner to make the toner a state capable of color forming in a yellow (Y) color or a black (K) color.

In the above, a color forming information applying step (means) in the aspect of the invention is described of a mechanism when a full color image is formed. However, the color forming information applying step in the aspect of the invention may be a color forming information applying step for forming a mono-color image in which any one of yellow, magenta and cyan is colored. In this case, from the color forming information applying exposure head 54, only light having a particular wavelength corresponding to desired color forming of the yellow, magenta and cyan is illuminated. Other preferable conditions are same as that in the full color image formation.

Furthermore, in the case of an optically non-color forming toner being used, when only a monochrome image is formed, since there is no need of a color forming information applying mean, at first, a recording apparatus that forms monochrome images alone is prepared. When a demand for color images becomes higher, later, a color forming information applying mean may be added to expand to a color image forming unit.

<Transfer Step>

The color forming information-applied toner is after that in block transferred on a recording medium 26. A known transferring apparatus 18 can be used to transfer. For instance, in the case of the contact type, a roll, a brush or a blade can be used, and, in the case of the non-contact type, a corotron, a scorotron or a pin corotron can be used. Furthermore, pressure or pressure and heat can be used to transfer.

A transfer bias is preferably set in the range of 300 to 1000 V (absolute value) and an alternating current (Vpp: 400 to 4 kV, 400 to 3 kHz) may be further superposed.

<Fixing Step and Color Forming Step>

The toner image thus placed in a state capable of color forming (or of maintaining a non-color forming state) is colored as mentioned above when the recording medium 26 is heated with the fixing apparatus 22. As the fixing apparatus 22, a known fixing means can be used. For instance, as a heating member and a pressurizing member, each of a roll and a belt can be selected, and, as the heat source, a halogen lamp and an IH can be used. The arrangement thereof can cope with various paper passes such as a straight pass, rear C pass, front C pass, S pass and side C pass.

Figure 13:
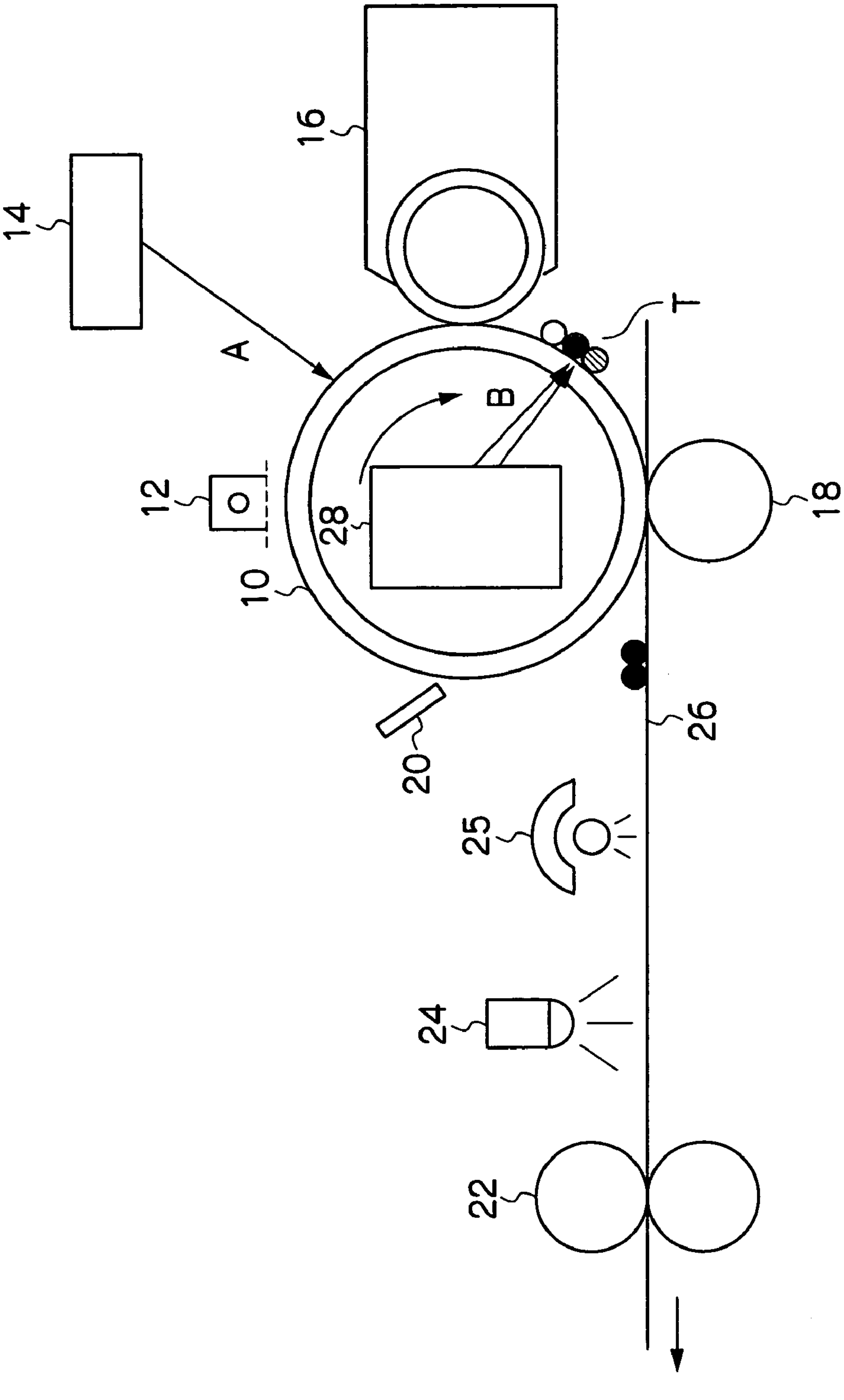
FIG. 13 is a schematic configurational view showing another example of an image forming apparatus according to the aspect of the invention.

In the embodiment, the fixing apparatus 22 combines a color forming step and a fixing step. However, the color forming step may be disposed separately from the fixing step. A position where a color forming unit for carrying out the color forming step is placed is not particularly restricted. However, for instance, as shown in FIG. 13, a color forming apparatus 25 and a light illuminating apparatus 24 may be disposed on an upstream side of the fixing apparatus 22. When thus disposed, since a heating temperature for color forming and a heating temperature for fixing the toner to the recording medium 26 can be separately controlled, the degree of freedom in designing color forming materials and toner binder materials can be improved.

In this case, as to the color forming method, various methods can be considered corresponding to color forming mechanisms of the toner particle. As the color forming apparatus (color forming means) 25, for instance, in a method where, for instance, with light having a further different wavelength, a color forming relating substance is cured or photo-decomposed in the toner to color or restrict, with a method where, a light-emitting device having a particular light is used, and in a method where capsulated color forming particles are pressurized to destroy to color or restrict, a pressurizing apparatus can be used.

However, such a chemical reaction that causes color forming is generally slow in a reaction speed due to migration or diffusion. Accordingly, when any one of the above methods is taken, sufficient diffusion energy has to be given. From these points, a method where a reaction is accelerated by heating can be said most excellent. Accordingly, the fixing apparatus 22 that combines the color forming step and the fixing step can be preferably used including the space saving.

<Other Steps>

In the aspect of the invention, a light illuminating step for illuminating light on an image obtained through the fixing and color forming steps is preferably included. Thereby, a reactive substance remaining in the color forming portion controlled in a state incapable of color forming can be decomposed or deactivated; accordingly, a color balance after image formation can be assuredly inhibited from varying and a background color can be removed or bleached.

In the embodiment, the light illuminating step is disposed after the fixing step. However, in the case of a fixing method where heating and melting are not applied, for instance, pressure fixing where pressure is used to fix, after the light illuminating step, the fixing step can be carried out.

The light illuminating apparatus 24, as far as it can stop further forwarding the color forming of the toner, is not particularly restricted. A known lamp such as a fluorescent lamp, LED and EL can be used. Furthermore, a wavelength preferably contains in light three wavelengths for color forming the toner, the illuminance is preferably set substantially in the range of 2,000 to 200,000 lux and an exposure time is preferably set in the range of 0.5 to 60 sec.

In addition thereto, the image forming method may contain a known step utilized in an existing electrophotography process that is carried out with a color forming agent such as a pigment. For instance, a cleaning step where a surface of an image holding member on which a toner image is transferred is cleansed may be contained. As a cleaner 20, a known cleaner such as a blade or a brush can be used. Furthermore, a so-called cleaner-less process where a cleaner 20 is removed can be applied as well.

Still furthermore, other than the above, a transfer step may be an intermediate transfer method that includes a first transfer step where a toner image is transferred from an image holding member to an intermediate transfer body such as an intermediate transfer belt and a second transfer step where the toner image transferred on the intermediate transfer body is transferred on a recording medium.

<Toner used>

In what follows, a toner used in the aspect of the invention will be described.

The toner used in the aspect of the invention is, as mentioned above, a toner that is controlled, when color forming information is applied with light, so as to be able to maintain color forming or non-color forming state. “Applying color forming information with light” and “maintaining a color forming or non-color forming state” are as well same as mentioned above.

As a toner that has the above-mentioned function, various types can be cited. A toner that is disclosed in, for instance, JP-A No. 2003-330228, is a particle obtained by dispersing and mixing a plurality of microcapsules having a capsule wall of which mass permeability varies upon an external stimulus in a toner resin, one of two kinds of reactive substances that are mixed each other in the particle to cause a color forming reaction (dye precursors of the respective colors) being contained in a microcapsule, and the other (color developer) being contained in a toner resin outside of the microcapsule.

In the toner, as a capsule wall, a photoisomerizing substance of which mass permeability increases when light having a particular wavelength is irradiated is used. By making use of a cis-trans transfer thereof, when light is irradiated or ultrasonic is applied, two kinds of reactive substances present inside and outside of a capsule are caused to react to color.

Accordingly, in such a toner, many of the microcapsules cannot be contained in the toner and in some cases these are eccentrically located. As a result, when it is used in the aspect of the invention, in some cases, the microcapsule may not sufficiently receive light.

Accordingly, in the aspect of the invention, a toner that includes a first component and a second component that are present in an isolated state from each other and color upon reacting each other, and a photocurable composition containing any one of the first component and the second component, and that, when color forming information is applied with light to maintain a curing or non-curing state of the photocurable composition, controls a reaction for the color forming (hereinafter, in some cases, referred to as “F toner”) can be preferably used.

A color forming mechanism and a brief configuration of the toner will be described below.

The F toner, as mentioned below, has in a binder resin at least one continuous region that is called a color forming portion and capable of color forming in one particular color (or capable of maintaining a non-color forming state) upon applying color forming information with light.

Figure 14B:
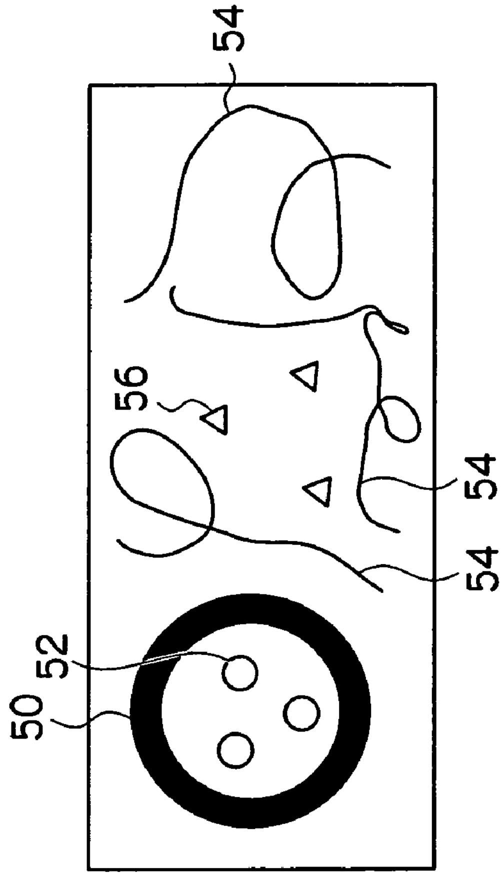
FIGS. 14A and 14B are schematic diagrams for explaining a color forming mechanism of a toner, FIG. 14A showing a color forming portion, and FIG. 14B showing an enlarged state thereof.
Figure 14A:
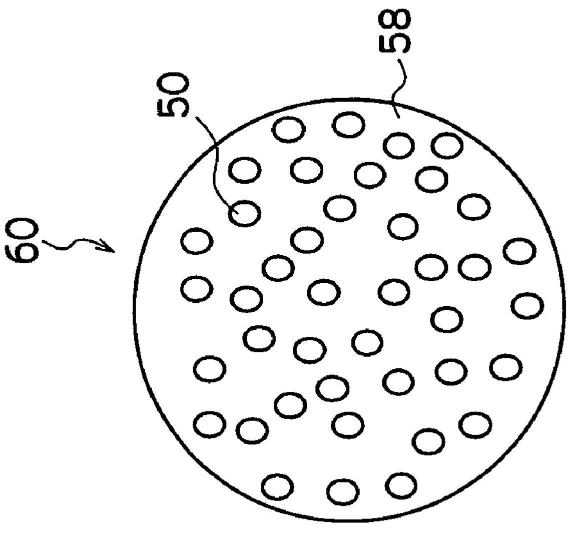

FIGS. 14A and 14B are schematic diagrams showing one example of the color forming portion in the F toner, FIG. 14A being a sectional view of one color forming portion, and FIG. 14B being one obtained by further expanding the color forming portion.

As shown in FIG. 14A, a color forming portion 60 includes color forming microcapsules 50 containing color forming substances of the respective colors and a composition 58 that surrounds that. As shown in FIG. 14B, the composition 58 includes a color developing monomer (second component) 54 having a polymerizing functional group that colors upon coming close to or coming into contact with a color forming substance (first component) 52 contained in the microcapsule 50 and a photopolymerization initiator 56.

In the color forming portion 60 that constitutes a toner particle, as a color forming substance 52 encapsulated in a color forming microcapsule 50, a triaryl leuco-compound excellent in the vividness of color forming hue is preferable. As the color developing monomer 54 that colors the leuco-compound (electron-releasing), an electron-receiving compound is preferable. In particular, a phenol compound is general and can be appropriately selected from color developers used in thermal paper and pressure-sensitive paper. Such electron-releasing color forming substance 52 and electron-receiving color developing monomer 54 cause an acid-base reaction to color the color forming substance.

As the photopolymerization initiator 56, a spectral sensitizing dye that is photosensitized by visible light to generate polymerizing radical that triggers a polymerization of the color developing monomer 54 is used. Furthermore, in order that, to the exposure of three primary color such as R color, G color and B color, the color developing monomer 54 can sufficiently forward a polymerization reaction, a substance that promotes a reaction of the spectral sensitizing dye is used. For instance, when an ion complex made of a spectral sensitizing dye (cation) that absorbs exposing light and a boron compound (anion) is used, upon exposing, the spectral sensitizing dye is photo-excited to transfer an electron to the boron compound to generate a polymerizing radical to start polymerization.

When these materials are combined, as the photosensitive color forming portion 60, color forming recording sensitivity substantially in the range of 0.1 to 0.2 $mJ/cm^2$ can be obtained.

Owing to whether light for applying color forming information is illuminated or not onto the color forming portion 60 having the above configuration, depending on the color forming portion 60, one having a polymerized color developing compound and a color developing monomer 54 that is not polymerized is present. Owing to a color forming apparatus such as heating thereafter, in the color forming portion 60 that has a color developing monomer 54 that was not polymerized, the color developing monomer 54 migrates owing to heat and migrates through a void in a separating wall of the color forming substance microcapsule 50 to diffuse in the color forming substance microcapsule. The color developing monomer 54 and the color forming substance 52 diffused into the microcapsule 50, as mentioned above, the color forming substance 52 being basic and the color developing monomer 54 being acidic, color the color forming substance 52 owing to an acid-base reaction.

On the other hand, a color developing compound undergone a polymerization reaction, in the color forming step due to heating after that, owing to bulkiness due to the polymerization, cannot diffuse and permeate through a void in a separating wall of the microcapsule 50 and thereby cannot react with the color forming substance 52 in the color forming microcapsule to color. Accordingly, the color forming microcapsule 50 remains colorless. That is, the color forming portion 60 that is illuminated with particular wavelength light exists without being colored.

When, at an appropriate stage after the color forming, an entire surface is again exposed with a white light source, a residual un-polymerized color developing monomer 54 all is polymerized to stably fix an image and a residual spectral sensitizing dye is decomposed to decolor a ground color. A color tone of the spectral sensitizing dye of the photopolymerization initiator 56 corresponding to a visible light region remains as a ground color to the end; however, an optical decolor forming phenomenon of a dye/boron compound can be used to decolor the spectral sensitizing dye. That is, when an electron transfers from a photo-excited spectral sensitizing dye to a boron compound, a polymerizing radical is generated. The radical, while causing a polymerization of a monomer, reacts with an excited dye radical to causes a color decomposition of a dye, resulting in decolor forming the dye.

In the F toner, color forming portions 60 color forming thus differently (for instance, color forming in a Y color, M color and C color), with the respective color developing monomers 54 maintained so as not to interfere with a color forming substance other than a target color forming substance 52 (in a state separated from each other), can be constituted as one microcapsule and used. In the F toner, since a space other than a microcapsule that contains an electron-releasing color forming substance is filled with an electron-receiving color developer and a photocurable composition and a color forming portion constituted therewith receives light, the light receiving efficiency in one toner particle is overwhelmingly higher than that of the toner disclosed in the JP-A No. 2003-330228. Accordingly, in comparison with other toners, an advantage of the back surface exposure can be sufficiently utilized.

Furthermore, as mentioned above, since the color forming information applying mechanism is not a reversible reaction, there is no restriction on a time up to color forming due to heating; as a result, printing can be carried out to a low speed region, and, in addition thereto, a degree of freedom of a disposition place of the fixing apparatus where color forming due to the heating is carried out is high.

A configuration of the F toner will be further detailed.

The F toner includes, as substances capable of color forming (color forming substances), a first component and a second component that exist in a separated state from each other and color when these react each other. Thus, when a reaction of two reactive components is utilized to color, the color forming can be readily controlled. The first component and the second component may be colored in advance in a state before color forming; however, these are particularly preferable to be substantially colorless substances.

In order to make the color forming control easier, as the color forming substances, two kinds of reactive components that color upon reacting each other are used. However, when the reactive components exist in a same matrix easy in the material diffusion even in a state where the color forming information is not applied with light, during storage or production of the toner, in some cases, spontaneous color forming proceeds.

Accordingly, the reactive components, respectively, as far as the color forming information is not applied, are necessary to be contained in different matrixes difficult in the material diffusion into mutual regions (isolated from each other).

In order to inhibit the material diffusion from occurring in a state where the color forming information is not applied with light to inhibit the spontaneous color forming from occurring during storage or production of the toner, it is preferable that a first component of two kinds of reactive components is contained in a first matrix, a second component is contained outside of the first matrix (second matrix) and, between the first matrix and the second matrix, a separating wall having a function of inhibiting the material diffusion between both matrixes from occurring and of, when an external stimulus such as heat is applied, depending on a kind of the stimulus, intensity thereof or a combination thereof, allowing the material diffusion between both matrixes is disposed.

In order to make use of such a separating wall to dispose two kinds of reactive components in a toner, a microcapsule can be preferably utilized.

In this case, in the F toner, it is preferable that, of the two kinds of reactive components, for instance, the first component is contained in a microcapsule and the second component is contained outside of the microcapsule. In that case, the inside of the microcapsule corresponds to the first matrix and the outside of the microcapsule corresponds to the second matrix.

The microcapsule has a core portion and an outer shell covering the core portion. The outer shell, as far as it has a function that, as far as the external stimulus such as heat is not applied, inhibits mass diffusion between the inside and outside of the microcapsule from occurring, and, when the external stimulus is applied, corresponding to the kind of the stimulus, intensity thereof and a combination thereof, allows mass diffusion to occur between the inside and outside of the microcapsule, is not particularly restricted. In the core portion, at least one of the reactive components is contained.

Furthermore, the microcapsule may be one that allows mass diffusion to occur between the inside and outside of the microcapsule under application of the stimulus such as illumination of light or pressure. However, a heat-responsive microcapsule that allows the mass diffusion to occur between the inside and outside of the microcapsule by heating (the mass permeability of the outer shell increase) is particularly preferable.

The mass diffusion between the inside and outside of the microcapsule when the stimulus is applied, from viewpoints of suppressing the color forming density from lowering at the image formation and the color balance of an image left under a high temperature environment from varying, is preferably irreversible one. Accordingly, an outer shell that constitutes the microcapsule preferably has a function where, owing to softening, decomposition, dissolution (compatibility with a surrounding member) and deformation under stimulus such as heating and light illumination, the mass permeability irreversibly increases.

In the next place, a preferable configuration when the F toner contains a microcapsule will be described.

As such a toner, one that contains a first component and a second component that color upon reacting each other, a microcapsule and a photocurable composition in which the second component is dispersed is preferable. As such a toner, three modes below can be cited.

That is, the F toner is preferably any one of a mode that contains a first component and a second component that color upon reacting each other, a photocurable composition and a microcapsule dispersed in the photocurable composition, the first component being contained in the microcapsule, and the second composition being contained in the photocurable composition (first mode), a mode that contains a first component and a second component that color upon reacting each other and a microcapsule containing a photocurable composition, the first component being contained outside of the microcapsule, and the second composition being contained in the photocurable composition (second mode), or a mode that contains a first component and a second component that color upon reacting each other, one microcapsule containing the first component and the other microcapsule containing a photocurable composition in which the second component is dispersed (third mode).

Among the three modes, in particular, the first mode is preferable from the viewpoints of the stability before applying color forming information with light and control of the color forming. In the following description of the toner, the toner according to the first mode is fundamentally premised to detail. However, a configuration, materials and producing method of the toner according to the first mode, which will be described below, are naturally utilized and converted even in the second and third modes.

The F toner that uses a combination of the heat-responsive microcapsule and the photocurable composition is particularly preferably any one of two types below.

(1) A toner in which, even when a photocurable composition is heated in a uncured state, a second component contained in the uncured photocurable composition is inhibited from mass diffusing, and, when the photocurable composition is heated after curing by illuminating color forming information applying light, the second component contained in the cured photocurable composition is promoted in the mass diffusion (hereinafter, in some cases, referred to as "photo-color forming toner").

(2) A toner in which, when a photocurable composition is heated in a uncured state (a state where a second component is not polymerized), a second component contained in the uncured photocurable composition is promoted in the mass diffusion, and, when the photocurable composition is heated after curing with color forming information applying light (after the second component is polymerized), the second component contained in the cured photocurable composition can be inhibited from mass diffusing (hereinafter, in some cases, referred to as "photo-non-color forming toner").

A main difference between the photo-color forming toner and the photo-non-color forming toner exists in materials constituting the photocurable composition. That is, while the photo-color forming toner contains at least the second component (that does not have the photopolymerizability) and a photopolymerizable compound in the photocurable composition, the photo-non-color forming toner contains at least a second component having a photopolymerizable group in a molecule in the photocurable composition.

In the photocurable composition that is used in the photo-color forming toner and the photo-non-color forming toner, a photopolymerization initiator is particularly preferably contained, and, as needs arise, other various kinds of materials may be contained.

As the photopolymerizable compound and the second component that are used in the photo-color forming toner, materials in which in a state where a photocurable composition is uncured an interaction works between both to inhibit the second component from mass diffusing in the photocurable composition and, in a state after curing of the photopolymerizable composition with color forming information applying light (polymerization of the photopolymerizable compound), an interaction between both diminishes to make the diffusion of the second component in the photocurable composition easy are used.

Accordingly, in the photo-color forming toner, when color forming information applying light having a wavelength that can cure the photocurable composition is illuminated in advance before heating (color forming step), the second component contained in the photocurable composition becomes a readily mass diffusible state. Accordingly, at the heating, owing to dissolution of the outer shell of the microcapsule, a reaction between the first component in the microcapsule and the second component in the photocurable composition (color forming reaction) is caused.

Adversely, when the photocurable composition, without illuminating the color forming information applying light having a wavelength that can cure the photocurable composition, is heated as it is, since the second component is trapped in the photopolymerizable compound to be incapable of coming into contact with the first component in the microcapsule, a reaction (color forming reaction) between the first component and the second component is not caused.

As described above, in the photo-color forming toner, when whether the color forming information applying light having a wavelength for curing the photocurable composition is illuminated or not and the heating are combined and applied, since the reaction (color forming reaction) between the first component and the second component can be controlled, the toner can be controlled in the color forming.

Furthermore, in the photo-non-color forming toner, since the second component itself has the photopolymerizability, even when the color forming information applying light is illuminated, unless a wavelength of the light is a wavelength that can cure the photocurable composition, a state where the second component contained in the photocurable composition is easy in the mass diffusion can be maintained. Accordingly, when the toner is heated in this state, owing to the dissolution of the outer shell of the microcapsule, a reaction between the first component in the microcapsule and the second component in the photocurable composition is caused (color forming reaction).

Adversely, when, before heating, color forming information applying light having a wavelength that can cure the photocurable composition is illuminated, the second components contained in the photocurable composition polymerize each other to be difficult to cause the mass diffusion of the second component contained in the photocurable composition. Accordingly, even heated, the second component cannot come into contact with the first component in the microcapsule; accordingly, a reaction (color forming reaction) between the first component and the second component is not caused.

As mentioned above, in the photo-non-color forming toner, when whether the color forming information applying light having a wavelength for curing the photocurable composition is illuminated or not and the heating treatment are combined and applied, since the reaction (color forming reaction) between the first component and the second component can be controlled, the toner can be controlled in the color forming.

In the next place, a preferable structure of the F toner will be more detailed of a case where the toner contains the photocurable composition and a microcapsule dispersed in the photocurable composition.

In this case, the toner may be one that has only one color forming portion that contains a photocurable composition and a microcapsule dispersed in the photocurable composition. However, one having two or more color forming portions is preferable. Here, the term "color forming portion" means a continuous region that, when the external stimulus is applied as mentioned above, can color in one particular color.

In the case of the toner containing two or more color forming portions, only one kind of color forming portions that can color in the same color may be contained in the toner. However, two or more kinds of color forming portions capable of color forming in mutually different colors can be particularly preferably contained in the toner. The reason for this is because, while color capable of color forming of one toner particle is limited to one in the former case, the latter case allows two or more kinds.

For instance, as two or more kinds of color forming portions that can color into colors different from each other, a combination that contains a yellow color forming portion capable of color forming in yellow color, a magenta color forming portion capable of color forming in magenta color and a cyan color forming portion capable of color forming in cyan color can be cited.

In this case, when, for instance, only any one kind of color forming portions is colored by applying the external stimulus, the toner can color in any one of colors of yellow, magenta and cyan, when any two kinds of the color forming portions are colored, the toner can color in a color obtained by combining colors of two kinds of color forming portions, that is, one toner particle can display various colors.

In the case of two or more kinds of color forming portions capable of color forming in mutually different colors being contained in the toner, a control of the color forming color can be realized when, other than to make kinds of the first component and the second component contained in the respective kinds of color forming portions and a combination thereof different, wavelengths of lights used for curing the photocurable compositions contained in the respective kinds of color forming portions are made different.

That is, in this case, since a wavelength of light necessary for curing the photocurable composition contained in the color forming portion is different for each kind of color forming portion, as the control stimulus, a plurality of kinds of color forming information applying lights different in wavelength corresponding to the kinds of the color forming portions may well be used. In order to differentiate wavelengths of lights necessary for curing the photocurable compositions contained in the color forming portion, a photopolymerization initiator responding to light having a wavelength different for each kind of color forming portion may be preferably contained in the photocurable composition.

For instance, in the case of three kinds of color forming portions capable of color forming in yellow, magenta and cyan being contained in the toner, when, as the photocurable composition contained in each kind of color forming portion, a material that can be cured by responding to any one of 405 nm, 532 nm and 657 nm in wavelength of light is used, by differentiating the color forming information applying lights (lights having particular wavelengths) having three different wavelengths, the toner can be colored in a desired color.

A wavelength of the color forming information applying light can be selected from a wavelength in a visible region. However, it may be selected from a wavelength in a UV region.

The toner used in the aspect of the invention may be one that contains a parent material of which main component is a binding resin same as that used in a toner that uses an existing color forming substance such as a pigment. In this case, in the parent material, each of the two or more color forming portions is preferably dispersed as particulate capsules (hereinafter, in some cases, referred to one capsule-like color forming portion as "photosensitive/thermosensitive capsule"). Furthermore, in the parent material, similarly to an existing toner that uses a color forming substance such as a pigment, a releasing agent and various kinds of additives may be contained.

The photosensitive/thermosensitive capsule includes a core portion that contains a microcapsule and a photocurable composition and an outer shell that covers the core portion, and the outer shell, as far as it can stably hold the microcapsule and the photocurable composition in the photosensitive/thermosensitive capsule so as not to allow leaking outside of the photosensitive/thermosensitive capsule during a toner producing process described below and storage of the toner, is not particularly restricted.

However, in the aspect of the invention, in the toner producing process described below, in order to inhibit the second component from permeating the outer shell to leak into a matrix outside of the photosensitive/thermosensitive capsule or the second component capable of color forming in the other color in the photosensitive/thermosensitive capsule from permeating the outer shell to flow in, a water-insoluble material such as a binding resin or a releasing agent made of a water-insoluble resin is preferably contained as a main component.

In the next place, toner constituents used in the F toner and materials/methods that are used when the respective toner constituents are prepared will be more detailed below.

In this case, in the toner, at least, a first component, a second component, a microcapsule containing the first component and a photocurable composition containing the second component are used. In the photocurable composition, a photopolymerization initiator is particularly preferably contained and various kinds of additives may be contained. Furthermore, in the microcapsule (core portion), a first component may exist in a solid state or together with a solvent.

In the photo-non-color forming toner, as a first component, an electron-releasing colorless dye or a diazonium chloride compound is used, and, as a second component, an electron-receiving compound having a photopolymerizable group or a coupler compound having a photopolymerizable group is used. Furthermore, in the photo-color forming toner, as a first component, an electron-releasing colorless dye is used and, as a second component, an electron-receiving compound (in some cases, referred to as "electron-receiving color developer" or "color developer") is used, and, as the photopolymerizable compound, a polymerizable compound having an ethylenic unsaturated bond is used.

In addition to the materials cited above, various kinds of materials same as that that constitute an existing toner that uses a color forming substance; a binding resin, a releasing agent, an inner additive and an outer additive, as needs arise, may be appropriately utilized. In what follows, the respective materials will be more detailed.

-First Component and Second Component-

As combinations of the first component and the second component, combinations (1) through (18) below can be preferably cited (In the following examples, the former one and the latter one, respectively, denote the first component and the second component.).

(1) A combination of an electron-releasing colorless dye and an electron-receiving compound.

(2) A combination of a diazonium salt compound and a coupling component (hereinafter, appropriately referred to as "coupler compound").

(3) A combination of an organic acid metal salt such as silver behenate or silver stearate and a reducing agent such as protocatechinic acid, spiroindan or hydroquinone.

(4) A combination of a long chain fatty acid iron salt such as ferric stearate or ferric myristinate and a phenol compound such as tannic acid, gallic acid or ammonium salicylate.

(5) A combination of an organic acid heavy metal salt such as a nickel salt, cobalt salt, lead salt, copper salt, iron salt, mercury salt or silver salt of acetic acid, stearic acid or palmitic acid and an alkali metal or alkaline earth metal sulfide such as calcium sulfide, strontium sulfide or potassium sulfide, or a combination of the organic acid heavy metal salt and an organic chelating agent such as s-diphenyl carbazide or diphenyl carbazone.

(6) A combination of a heavy metal sulfate such as a sulfate of silver, lead, mercury or sodium and a sulfur compound such as sodium tetrathionate, sodium thiosulfate or thiourea.

(7) A combination of an aliphatic acid ferric salt such as ferric stearate and an aromatic polyhydroxy compound such as 3,4-hydroxytetraphenyl methane.

(8) A combination of an organic acid metal salt such as silver oxalate or mercury oxalate and an organic polyhydroxy compound such as polyhydroxy alcohol, glycerin or glycol.

(9) A combination of an aliphatic acid ferric salt such as ferric pelargonate or ferric laurate and thiocesylcarbamide or an isothiocesylcarbamide derivative.

(10) A combination of an organic acid lead salt such as lead caproate, lead pelargonate or lead behenate and a thiourea derivative such as ethylene thiourea or N-dodecyl thiourea.

(11) A combination of a higher aliphatic acid heavy metal salt such as ferric stearate or copper stearate and zinc dialkyldithiocarbamate.

(12) A combination of resorcin and a nitroso compound, which forms an oxazine dye.

(13) A combination of a formazan compound and a reducing agent and/or a metal salt.

(14) A combination of a protected dye (or a leuco dye) precursor and a deprotecting agent.

(15) A combination of an oxidizable color forming substance and an oxidizing agent.

(16) A combination of a phthalonitrile and a diiminoisoindoline (combination for forming phthalocyanine).

(17) A combination of an isocyanate and a diiminoisoindoline (combination for forming a colored pigment).

(18) A combination of a pigment precursor and an acid or base (combination for forming a pigment).

As the first component cited in the above, a substantially colorless electron-releasing colorless dye or a diazonium compound is preferable.

As the electron-releasing colorless dye, so far known ones can be used. As far as these react with the second component to color, all electron-releasing colorless dyes can be used. Specifically, various kinds of compounds such as phthalide compounds, fluorane compounds, phenothiazine compounds, indolylphthalide compounds, leuco auramine compounds, rhodamine lactam compounds, triphenylmethane compounds, triazene compounds, spiropyrane compounds, pyridine compounds, pyrazine compounds and fluorene compounds can be cited.

As the second component, in the case of the photo-non-color forming toner, all that are a substantially colorless compound having a photopolymerizable group and a site that reacts with the first component to color in the same molecule and have functions of color forming upon reacting with a first component such as an electron-receiving compound having a photopolymerizable group or a coupler compound having a photopolymerizable group and of polymerizing responding to light to cure can be used.

As the electron-receiving compound having a photopolymerizable group, that is, a compound that has an electron-receiving group and a photopolymerizing group in the same molecule, all that have a photopolymerizing group, can react with an electron-releasing colorless dye that is one of first components to color and can be cured by photopolymerization can be used.

Furthermore, as an electron-receiving color developer that is a second component in the case of the photo-color forming toner, phenol derivatives, sulfur-containing phenol derivatives, organic carboxylic acid derivatives (for instance, salicylic acid, stearic acid and resorcinol acid) and metal salts thereof, sulfonic acid derivatives, urea or thiourea derivatives, acid clay, bentonite, novolak resins, metal-treated novolak resins and metal complexes can be cited.

Furthermore, in the photo-color forming toner, as the photopolymerizable compound, a polymerizable compound having an ethylenic unsaturated bond is used. The polymerizable compound having an ethylenic unsaturated bond is a polymerizable compound that has at least one ethylenic unsaturated double bond in a molecule such as acrylic acid and a salt thereof, acrylic acid esters or acryl amides.

In the next place, the photopolymerization initiator will be described. The photopolymerization initiator, when color forming information applying light is illuminated, generates a radical to cause a polymerization reaction in a photocurable composition and can promote the reaction. Owing to the polymerization reaction, the photocurable composition can be cured.

The photopolymerization initiator can be appropriately selected from known photopolymerization initiators, and, among these, one that contains a spectral sensitizing compound having a maximum absorption wavelength in the range of 300 to 1000 nm and a compound that interacts with the spectral sensitizing compound is preferable.

However, when a compound that interacts with the spectral sensitizing compound is a compound that has both structures of a dye portion having the maximum absorption wavelength in the range of 300 to 1000 nm and a borate portion in the structure, the spectral sensitizing dye may be done without.

As the compound that interacts with the spectral sensitizing compound, among known compounds that can initiate a photopolymerization reaction with a photopolymerizing group in the second component, one or two or more kinds of compounds can be appropriately selected and used.

The compound, when allowed coexisting with the spectral sensitizing compound, sensitively responds to illuminating light in the spectral sensitizing wavelength region to efficiently generate a radical; accordingly, high sensitivity can be obtained and, with an arbitrary light source in UV to IR region, a radical generation can be controlled.

As the "compound that interacts with a spectral sensitizing compound", an organic borate compound, benzoin ethers, a s-triazine derivative having a trihalogen-substituted methyl group, an organic peroxide or an azinium salt compound are preferable, an organic borate compound being more preferable. When the "compound that interacts with a spectral sensitizing compound" is used together with the spectral sensitizing compound, in an exposed exposure portion, a radical can be locally and effectively generated and thereby high sensitivity can be obtained.

Furthermore, in the photocurable composition, with an intention of promoting a polymerization reaction, as an auxiliary agent, a reducing agent such as an oxygen scavenger or a chain transfer agent of an active hydrogen donor or other compound that chain transferably promotes a polymerization can be added.

As the oxygen scavenger, phosphine, phosphonate, phosphite, silver salt (I) or other compound that can be readily oxidized with oxygen can be cited. Specifically, N-phenyl glycine, trimethyl barbituric acid, N,N-dimethyl-2,6-diisopropyl aniline, and N,N,N-2,4,6-pentamethyl aniline acid can be cited. Furthermore, thiols, thioketones, trihalomethyl compounds, Rofin dimer compounds, iodonium salts, sulfonates, azinium salts, organic peroxides and azides are as well useful as the polymerization promoter.

In the F toner, a first component such as an electron-releasing colorless dye or a diazonium salt compound is encapsulated in a microcapsule and used.

As a microcapsulating method, a known method can be used. For instance, a method that makes use of a coacervation of a hydrophilic wall forming material described in U.S. Pat. Nos. 2,800,457 and 2,800,458, an interfacial polymerizing method described in U.S. Pat. No. 3,287,154, U.K. Patent No. 990443, and JP-B Nos. 38-19574, 42-446 and 42-771, a polymer precipitation method described in U.S. Pat. Nos. 3,418, 250 and 3,660,304, a method that uses isocyanate polyol wall material described in U.S. Pat. No. 3,796,669, a method that uses an isocyanate wall material described in U.S. Pat. No. 3,914,511, a method that uses urea-formaldehyde or urea-formaldehyde-resorcinol wall forming material described in U.S. Pat. Nos. 4,001,140, 4,087,376 and 4,089,802, a method that uses a wall forming material such as a melamine-formaldehyde resin or hydroxypropyl cellulose described in U.S. Pat. No. 4,025,455, an in-situ method due to polymerization of a monomer described in JP-B No. 36-9168 and JP-A No. 51-9079, an electrolysis dispersion cooling method described in U.K. Patent Nos. 952807 and 965074, a spray drying method described in U.S. Pat. No. 3,111,407 and U.K. Patent No. 930422, and a method described in JP-B No. 7-73069 and JP-A Nos. 4-101885 and 9-263057 can be cited.

A material that can be used for a microcapsule wall is added inside and/or outside of an oil drop. As materials that can be used for the microcapsule wall, for instance, polyurethane, polyurea, polyamide, polyester, polycarbonate, a urea-formaldehyde resin, a melamine resin, polystyrene, a styrene-methacrylate copolymer and a styrene-acrylate copolymer can be cited. Among these, polyurethane, polyurea, polyamide, polyester and polycarbonate are preferable, polyurethane and polyurea being more preferable. The polymer substances can be used as well in a combination of two or more kinds.

A volume average particle diameter of a microcapsule is preferably prepared so as to be in the range of 0.1 to 3.0 μm and more preferably prepared so as to be in the range of 0.3 to 1.0 μm.

The photosensitive/thermosensitive capsule may contain a binder and this is same as well in a toner having one color forming portion.

As the binder, other than one similar to a binder that is used in emulsifying dispersion of the photocurable composition and a water-soluble polymer that is used when a first reactive substance is capsulated, solvent-soluble polymers such as polystyrene, polyvinyl formal, polyvinyl butyral, polymethyl acrylate, polybutyl acrylate, polymethyl methacrylate, acrylic resins of polybutyl methacrylate and copolymers thereof, a phenol resin, a styrene-butadiene resin, ethyl cellulose, an epoxy resin or a urethane resin, or polymer latexes thereof can be used as well. Among these, gelatin and polyvinyl alcohol are preferable. Furthermore, as a binder, a binding resin described below may be used.

Furthermore, in the F toner, a binding resin that is used in an existing toner can be used. The binding resin, in a toner having, for instance, a structure in which photosensitive/thermosensitive capsules are dispersed in a parent material, can be utilized as a main component that constitutes the parent material and a material constituting an outer shell of the photosensitive/thermosensitive capsule without restricting thereto.

The binding resin is not particularly restricted. Known crystalline or amorphous resin materials can be used. In order to apply the low temperature fixability in particular, a crystalline polyester resin having the sharp melt property is useful. Furthermore, as the amorphous polymer (amorphous resin), known resin materials such as a styrene acryl resin and a polyester resin can be used; however, an amorphous polyester resin is particularly preferable.

In addition, the F toner may contain other components than ones cited above. Other components, without restricting particularly, can be appropriately selected corresponding to an object. For instance, various kinds of known additives such as a releasing agent, inorganic fine particles, organic fine particles and a charge controlling agent that are used in an existing toner can be cited.

In the next place, a producing method of the F toner will be briefly described.

The F toner is preferably prepared by utilizing a known wet method such as an aggregation and coalescence method. In particular, in preparing a toner that contains a first component and a second component that color upon reacting each other, a photocurable composition and microcapsules dispersed in the photocurable composition, and has a structure in which the first component is contained in the microcapsule and the second component is contained in the photocurable composition, a wet producing method is preferable.

The microcapsule used in a toner having the above structure is particularly preferable to be a heat-responsive microcapsule. However, it may be a microcapsule responsive to other stimulus such as light.

In the production of the toner, a known wet method can be utilized. However, among wet producing methods, from viewpoints of the capability of suppressing the maximum process temperature low and the easiness of producing toners having various structures, the aggregation and coalescence method is particularly preferable.

Furthermore, in comparison with an existing toner where a pigment and a binding resin are main components, the toner having the above structure much contains the photocurable composition containing a low molecular weight component as a main component. Accordingly, the mechanical strength of particles obtained in the course of granulating the toner tends to be insufficient. However, since the aggregation and coalescence method does not necessitate a high shearing force, in this point as well, the aggregation and coalescence method can be preferably used.

In general, the aggregation and coalescence method includes, after dispersion solutions of various kinds of materials that constitute the toner are prepared, an aggregation step where, in a raw material dispersion solution obtained by blending two or more kinds of dispersion solutions, aggregated particles are formed; and a coalescence step where aggregated particles formed in the raw material dispersion solution are coalesced, and, as needs arise, between the aggregation step and the coalescence step, a sticking step where on a surface of the aggregated particle a component that forms a covering layer is stuck to form a covering layer (covering layer forming step) is applied.

In the production of the F toner as well, although kinds and combinations of the various kinds of dispersion solutions that are used as raw materials are different, in addition to the aggregation step and the coalescence step, as needs arise, the sticking step can be appropriately combined to produce the toner.

For instance, in the case of a toner that has a photosensitive/thermosensitive capsule dispersion structure in a resin, in the beginning, by undergoing (a1) a first aggregation step where, in a raw material dispersion solution that contains a microcapsule dispersion solution where microcapsules containing the first component are dispersed and a photocurable composition dispersion solution in which a photocurable composition containing a second component is dispersed, a first aggregated particle is formed, (b1) a sticking step where, in the raw material dispersion solution in which the first aggregated particle is formed, a first resin particle dispersion solution where resin particles are dispersed is added to stick the resin particle on a surface of the aggregated particle, and (c1) a first coalescence step where the raw material dispersion solution containing aggregated particles on a surface of which the resin particles are stuck is heated to coalesce to obtain a first coalesced particle (photosensitive/thermosensitive capsule), at least one kind of photosensitive/thermosensitive capsule dispersion solutions capable of color forming in different colors from each other is prepared.

Subsequently, when (d1) a second aggregation step where in a mixed solution obtained by blending one or more kind of the photosensitive/thermosensitive capsule dispersion solutions and a second resin particle dispersion solution where resin particles are dispersed second aggregated particles are formed and (e1) a second coalescence step where a mixed solution containing the second aggregated particles is heated to obtain a second coalesced particle are undergone, a toner having a photosensitive/thermosensitive capsule dispersion structure can be obtained.

The kinds of the photosensitive/thermosensitive capsule dispersion solutions used in the second coalescence step are preferably two or more kinds. Furthermore the photosensitive/thermosensitive capsule obtained through (a1) through (c1) steps may be used as it is as a toner (that is, a toner including only one color forming portion).

Furthermore, in the case of a toner containing only one color forming portion being prepared, in place of the above-mentioned sticking step, a first sticking step where a releasing agent dispersion solution where a releasing agent is dispersed is added to a raw material dispersion solution where the first aggregated particles are formed to stick the releasing agent on a surface of the aggregated particle and a second sticking step where the first resin particle dispersion solution in which resin particles are dispersed is added to a raw material dispersion solution undergone the first sticking step to stick the resin particles on a surface of an aggregated particle on a surface of which the releasing agent is stuck may be carried out.

A volume average particle diameter of the F toner that can be used in the aspect of the invention, without particularly restricting, may be appropriately controlled depending on a structure of the toner, the kinds and number of the color forming portions contained in the toner.

However, when the kinds of color forming portions that are contained in the toner and capable of color forming in mutually different colors are substantially 2 to 4 kinds (for instance, a case where the toner contains three kinds of color forming portions capable of color forming in yellow, cyan and magenta, respectively), volume average particle diameters corresponding to the respective toner structures are preferably in the following ranges.

That is, in the case of a structure of the toner being, for instance, a photosensitive/thermosensitive capsule (color forming portion) dispersion structure, a volume average particle diameter of the toner is preferably in the range of 5 to 40 μm and more preferably in the range of 10 to 20 μm. Furthermore, a volume average particle diameter of the photosensitive/thermosensitive capsules contained in the photosensitive/thermosensitive dispersion structure toner that has such a particle diameter is preferably in the range of 1 to 5 μm and more preferably in the range of 1 to 3 μm.

When the volume average particle diameter of the toner is less than 5 μm, since an amount of the color forming component contained in the toner becomes less, in some cases, the color reproducibility is deteriorated or the image density is lowered. Furthermore, when the volume average particle diameter exceeds 40 μm, in some cases, the irregularity on an image surface becomes larger or the irregularity of the gloss on an image surface is caused to deteriorate image quality.

The toner having a photosensitive/thermosensitive capsule dispersion structure in which a plurality of photosensitive/thermosensitive capsules is dispersed tends to be larger in the particle diameter in comparison with that of a small diameter toner (volume average particle diameter: substantially 5 to 10 μm) that uses an existing color forming substance. However, since the resolving power of an image is determined not by the particle diameter of the toner but by the particle diameter of the photosensitive/thermosensitive capsule, a higher definition image can be obtained. In addition, since the powder fluidity is as well excellent, even when an amount of an external additive is less, sufficient fluidity can be secured and the developability and the cleanability can be improved as well.

On the other hand, in the case of the toner that has only one color forming portion, in comparison with the above-mentioned case, smaller diameters can be readily obtained. A volume average particle diameter thereof is preferably in the range of 3 to 8 μm and more preferably in the range of 4 to 7 μm. When the volume average particle diameter is less than 3 μm, since the particle diameter is too small, in some cases, the powder fluidity cannot be sufficiently obtained or the sufficient durability cannot be obtained. Furthermore, when the volume average particle diameter exceeds 8 μm, in some cases, a high definition image cannot be obtained.

In the aspect of the invention, including the F toners described above, one that can be controlled so as to maintain a color forming or non-color forming state by illuminating light (or by not illuminating light) can be used irrespective of constituent materials used, a structure o0f the toner and a color forming mechanism.

In the toner that can be used in the aspect of the invention, a volume average particle size distribution index $GSD_V$ is 1.30 or less and a ratio of the volume average particle size distribution index $GSD_V$ to a number average particle size distribution index $GSD_P$ ($GSD_V/GSD_P$) is preferably 0.95 or more.

Further preferably, the volume average particle size distribution index $GSD_V$ is 1.25 or less and a ratio of the volume average particle size distribution index $GSD_V$ to a number average particle size distribution index $GSD_P$ ($GSD_V/GSD_P$) is more preferably 0.97 or more.

When the volume average particle size distribution index $GSD_V$ exceeds 1.30, in some cases, the resolving power of an image is deteriorated. Furthermore, when a ratio of the volume average particle size distribution index $GSD_V$ to a number average particle size distribution index $GSD_P$ ($GSD_V/GSD_P$) is less than 0.95, in some cases, the charging property of the toner is deteriorated, the toner is spattered and fogging is caused to result in image defect.

In the aspect of the invention, values of the volume average particle diameter of the toner, the volume average particle size distribution index $GSD_V$ and the number average particle size distribution index $GSD_P$ are measured and calculated as shown below.

In the beginning, with a particle size distribution of a toner measured by use of a measurement device such as Coulter Multisizer II (trade name, produced by Beckman & Coulter Corp.), to divisional particle size ranges (channels), a cumulative distribution is drawn of volumes and numbers of individual toner particles from a small diameter side. Particle diameters that become 16% in the cumulative distributions are defined as volume average particle diameter D16*v* and number average particle diameter D16*p*, and particle diameters that become 50% in the cumulative distributions are defined as volume average particle diameter D50*v* and number average particle diameter D50*p*. Similarly, particle diameters that become 84% in the cumulative distributions are defined as volume average particle diameter D84*v* and number average particle diameter D84*p*. At this time, a volume average particle size distribution index ($GSD_V$) is defined as $(D84v/D16v)^{1/2}$ and a number average particle size distribution index ($GSD_P$) is defined as $(D84p/D16p)^{1/2}$. With the relational expressions, a volume average particle size distribution index ($GSD_V$) and a number average particle size distribution index ($GSD_p$) can be calculated.

Furthermore, volume average particle diameters of the microcapsules and the photosensitive/thermosensitive capsules can be measured with for instance a laser diffraction particle size distribution measurement apparatus (LA-700, produced by Horiba Ltd.).

Furthermore, in the toner according to the aspect of the invention, a shape factor SF1 expressed by a following equation is preferably in the range of 110 to 130.

$$SF1=(ML^2/A)\times(\pi/4)\times100 \qquad \text{equation (1)}$$

[In the equation (1), a mark ML expresses the maximum length (μm) of the toner and a mark A expresses a projection area (μm$^2$) of the toner.]

In the case of the shape factor SF1 being less than 110, when an image is formed, in the transfer step, the toner tends to remain on a surface of the image holding member to be necessary to remove the residual toner. However, when the residual toner is cleansed with a blade, the image holding member tends to be damaged, resulting in causing image defect in some cases.

On the other hand, in the case of the shape factor SF1 exceeding 130, when the toner is used as a developer, in some cases, owing to a collision with the carrier in the developing unit, the toner may be destroyed. At this time, resultantly, fine particles increase and a releasing agent component exposed by the fine particles on the toner surface contaminates a surface of the image holding member. Thereby, not only damage the charging characteristics are damaged but also, in some cases, a problem of generating blur due to the fine particles is caused.

The shape factor SF1 was measured as follows with a Luzex image analyzer (trade name, produced by Nireco Corp.). Firstly, an optical microscope image of toners sprinkled on a slide glass was taken through a video camera in Luzex image analyzer, the maximum length (ML) and the projection area (A) were measured of 50 or more toner particles, a square of the maximum length and a projection area were calculated of individual toners, and the shape factor SF1 was obtained by the above equation (1).

<Developer>

The toner that is used in the aspect of the invention may be used as it is as a single component developer. However, in the aspect of the invention, it is preferably used as a toner in a two component developer that includes a carrier and a toner.

Now, from a viewpoint that a color image can be formed with one kind of developer, the developer is preferably (1) a developer that has one kind of toner having two or more kinds of color forming portions that contain the photocurable composition and microcapsules dispersed in the photocurable composition and in which the two or more kinds of color forming portions contained in the toner can color in colors different from each other, or (2) a developer that has at least two kinds of toners having one color forming portion that contains the photocurable composition and microcapsules dispersed in the photocurable composition in a mixed state and in which the color forming portions of the two or more kinds of toners can color in colors different from each other.

For instance, in the developer of the former type, it is preferable that three kinds of color forming portions are contained in the toner and the three kinds of color forming portions are made of a yellow color forming portion capable of color forming in yellow, a magenta color forming portion capable of color forming in magenta and a cyan color forming portion capable of color forming in cyan. In the developer of the latter type, it is preferable that a yellow color forming toner of which color forming portion is capable of color forming in yellow color, a magenta color forming toner of which color forming portion is capable of color forming in magenta color, and a cyan color forming toner of which color forming portion is capable of color forming in cyan color are contained in a mixed state in the developer.

As a carrier that can be used in a two component developer, a resin is preferably coated on a surface of a core material. As the core material of the carrier, as far as the above conditions are satisfied, there is no particular restriction. For instance, magnetic metals such as iron, steel, nickel and cobalt, alloys of manganese, chromium and rare earths therewith, magnetic oxides such as ferrite and magnetite can be cited. However, from viewpoints of the surface property of the core material and the electric resistance of the core material, preferably, ferrite, in particular, alloys with manganese, lithium, strontium and magnesium can be cited.

Furthermore, as a resin that is coated on a surface of the core material, ones that can be used as the matrix resin, without particular restriction, can be appropriately selected depending on the object.

In the two-component developer, as a mixing ratio (mass ratio) of the toner in the aspect of the invention and the carrier, a range of toner: carrier=substantially 1:100 to 30:100 is preferable and a range of toner: carrier =substantially 3:100 to 20:100 is more preferable.

<Test Examples>

In order to confirm an action of the embodiment, tests such as shown below are carried out.

(Preparation of Toner)

As shown below, the photo-non-color forming F toner in which, in a binding resin, color forming portions (photosensitive/thermosensitive capsule) are dispersed is obtained.

-Preparation of Microcapsule Dispersion Solution (1)-

Into 16.9 parts by mass of ethyl acetate, 8.9 parts by mass of an electron-releasing colorless dye (1) capable of color forming in yellow is dissolved, followed by further adding 20 parts by mass of a capsule wall material (trade name: Takenate D-110N, produced by Takeda Chemical Industries, Ltd.) and 2 parts by mass of a capsule wall material (trade name: Millionate MR-200, produced by Nippon Polyurethane Industry Co., Ltd.).

An obtained solution is added to a mixed solution of 42 parts by mass of 8 mass % phthalized gelatin, 14 parts by mass of water and 1.4 parts by mass of 10 mass % sodium dodecylbenzenesulfonate, followed by applying emulsifying dispersion at a temperature of 20° C., and thereby an emulsified solution is obtained. In the next place, to an obtained emulsified solution, 72 parts by mass of a 2.9% tetraethylenepentamine aqueous solution is added, followed by heating to 60° C. under agitation, after 2 hr, a microcapsule dispersion solution (1) containing an electron-releasing colorless dye (1) in a core portion and having an average particle diameter of 0.5 μm is obtained.

A glass transition temperature of a material (a material obtained by reacting Takenate D-110N and Millionate MR-200 under the conditions substantially same as the above) that constitutes an outer shell of the microcapsule contained in the microcapsule dispersion solution (1) is 100° C.

-Preparation of Microcapsule Dispersion Solution (2)-

Except that the electron-releasing colorless dye (1) is changed to an electron-releasing colorless dye (2), similarly to a case where the microcapsule dispersion solution (1) is prepared, a microcapsule dispersion solution (2) is obtained. An average particle diameter of the microcapsules in the dispersion solution is 0.5 μm.

-Preparation of Microcapsule Dispersion Solution (3)-

Except that the electron-releasing colorless dye (1) is changed to an electron-releasing colorless dye (3), similarly to a case where the microcapsule dispersion solution (1) is prepared, a microcapsule dispersion solution (3) is obtained. An average particle diameter of the microcapsules in the dispersion solution is 0.5 μm.

Chemical structural formulas of electron-releasing colorless dyes (1) through (3) used in preparing the microcapsule dispersion solutions (1) through (3) are shown below.

(1)

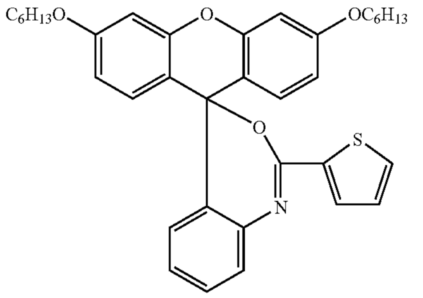

Electron-releasing Colorless Dye (2)

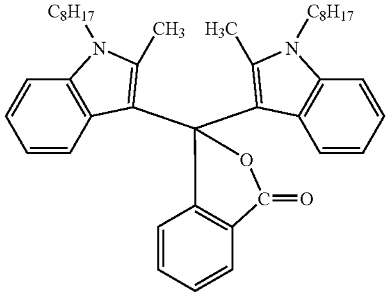

Electron-releasing Colorless Dye (3)

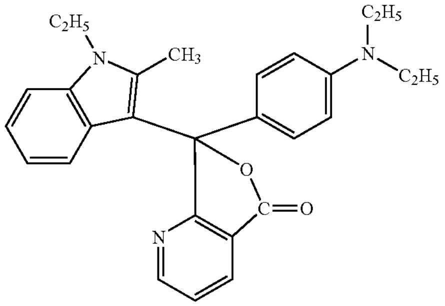

Electron-releasing Colorless Dye

-Preparation of Photocurable Composition Dispersion Solution (1)-

Firstly, 100.0 parts by mass of a mixture (mixing ratio of 50:50) of electron-receiving compounds (1) and (2) that have a polymerizing group and 0.1 parts by mass of a thermal polymerization inhibitor (ALI) are dissolved in 125.0 parts by mass of isopropyl acetate (solubility in water: substantially 4.3%) at 42° C., thereby a mixed solution I is obtained.

In the mixed solution I, 18.0 parts by mass of hexaarylbiimidazole (1) [2,2'-bis(2-chlorophenyl)-4,4',5,5'tetraphenyl-1,2'-biimidazole], 0.5 parts by mass of a nonionic organic dye and 6.0 parts by mass of an organic boron compound are added and dissolved at 42° C., thereby a mixed solution II is obtained.

The mixed solution II is added in a mixed solution of 300.1 parts by mass of 8 mass % gelatin aqueous solution and 17.4 parts by mass of 10 mass % surfactant aqueous solution (1), followed by emulsifying by use of a homogenizer (produced by Nihon Seiki Corp.) at a rotation number of 10,000 for 5 min, further followed by applying a solvent removal treatment at 40° C. for 3 hr, and thereby a photocurable composition dispersion solution (1) of which solid content is 30 mass% is obtained.

Structural formulas of the electron-receiving compound (1) having a polymerizing group, electron-receiving compound (2) having a polymerizing group, thermal polymerization inhibitor (ALI), hexaarylbiimodazole (1), surfactant (1), nonionic organic dye and organic boron compound that are used to prepare the photocurable composition dispersion solution (1) are shown below.

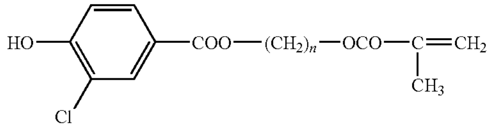

n = 5 (1)
n = 6 (2)

Polymerizable Electron-receiving Compound

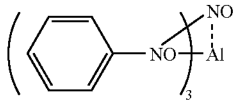

ALI

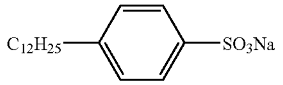

Surfactant (1)

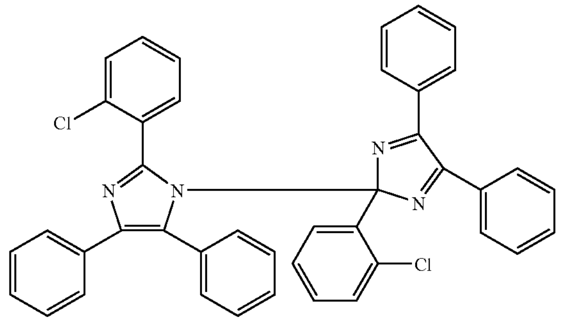

Hexaaryl biimidazole

-continued

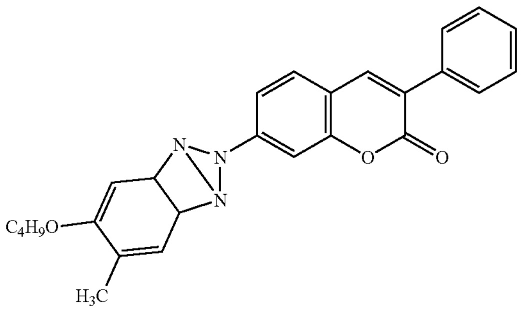

Nonionic Organic Dye

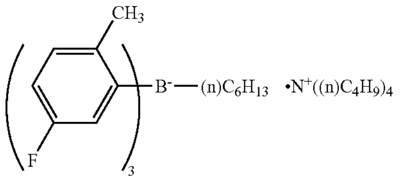

Organic Boron Compound

-Preparation of Photocurable Composition Dispersion Solution (2)-

In a mixed solution of 0.6 parts by mass of the organic borate compound (I) described below, 0.1 parts by mass of a spectral sensitizing dye borate compound (I) shown below, 0.1 parts by mass of an auxiliary agent (1) that aims higher sensitivity and 3 parts by mass of isopropyl acetate (solubility in water: substantially 4.3%), 5 parts by mass of an electron-receiving compound (3) having a polymerizing group and shown below are added.

An obtained solution is added in a mixed solution of 13 parts by mass of 13 mass % gelatin aqueous solution, 0.8 parts by mass of 2 mass % surfactant (2) aqueous solution shown below and 0.8 parts by mass of 2 mass % surfactant (3) aqueous solution shown below, followed by emulsifying with a homogenizer (produced by Nihon Seiki Corp.) at a rotation number of 10,000 for 5 min, thereby a photocurable composition dispersion solution (2) is obtained.

Structural formulas of the electron-receiving compound (3) having a polymerizing group, auxiliary agent (1), surfactant (2) and surfactant (3) used in preparing the photocurable composition dispersion solution (2) are shown below.

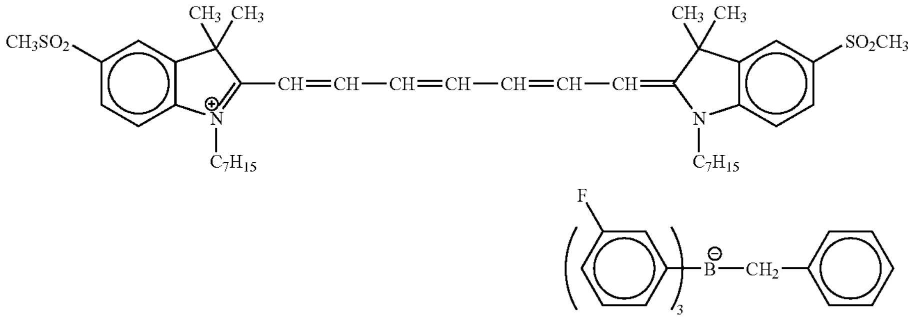

Organic Borate Compound (1)

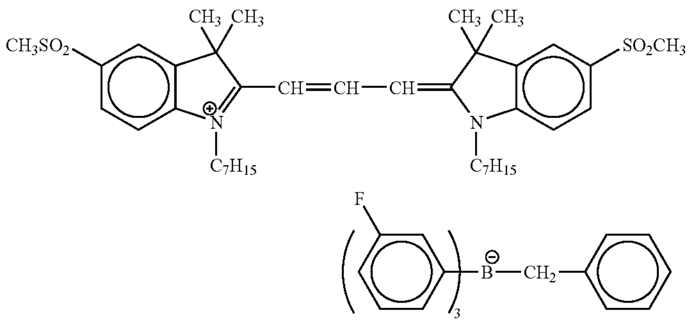

Spectral Sensitizing Dye Compound (I)

-continued

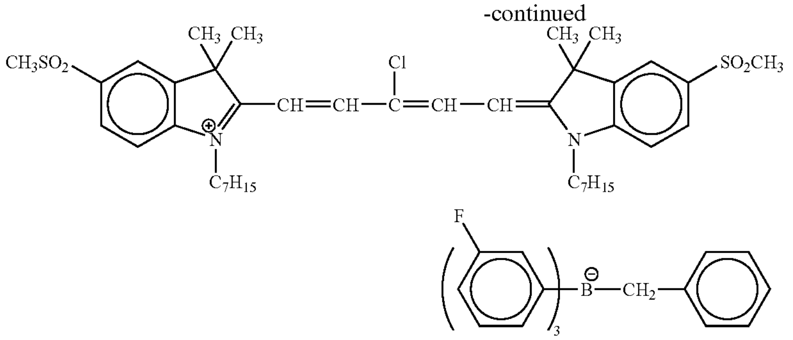

Spectral Sensitizing Dye Compound (II)

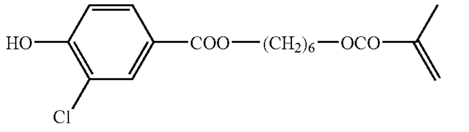

Polymerizable Electron-receiving Compound (3)

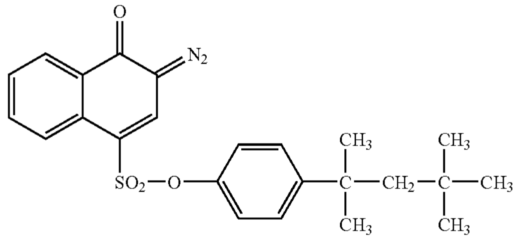

Auxiliary Agent (1)

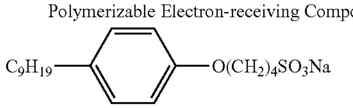

Surfactant (2)

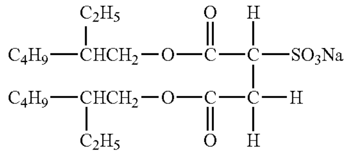

Surfactant (3)

-Preparation of Photocurable Composition Dispersion Solution (3)-

Except that, in place of the spectral sensitizing dye borate compound (I), 0.1 parts by mass of a spectral sensitizing dye borate compound (II) shown above is used, similarly to a case where the photocurable composition dispersion solution (2) is prepared, a photocurable composition dispersion solution (3) is obtained.

-Preparation of Resin Particle Dispersion Solution-

Styrene: 460 parts by mass

N-butyl acrylate: 140 parts by mass

Acrylic acid: 12 parts by mass

Dodecanthiol: 9 parts by mass

Above components are mixed and dissolved to prepare a solution. Subsequently, to a solution in which 12 parts by mass of an anionic surfactant (trade name: DowFax, produced by Rhodia Corp.) is dissolved in 250 parts by mass of ion-exchange water, the solution is added, followed by dispersing and emulsifing in a flask, thereby an emulsified solution (monomer-emulsified solution A) is prepared.

Furthermore, 1 parts by mass of an anionic surfactant (trade name: Dowfax, produced by Rhodia Corp.) is dissolved in 555 parts by mass of ion exchange water and charged in a polymerizing flask. The polymerizing flask is closely sealed, provided with a reflux tube and, while charging nitrogen therein and slowly agitating, heated to 75° C. with a water bath and held there.

In the next place, a solution in which 9 parts by mass of ammonium persulfate are dissolved in 43 parts by mass of ion exchange water is dropped through a quantitative pump in the polymerizing flask over 20 min, followed by dropping the monomer emulsified solution A as well through a quantitative pump over 200 min.

Thereafter, while continuing slowly agitating, the polymerizing flask is held at 75° C. for 3 hr to complete the polymerization.

Thereby, a resin particle dispersion solution, in which a median diameter of particles is 210 nm, a glass transition temperature is 51.5° C., a weight average molecular weight is 31,000 and a solid content is 42 mass %, is obtained.

-Preparation of Photosensitive/thermosensitive Capsule Dispersion Solution (1)-

Microcapsule dispersion solution (1): 150 parts by mass

Photocurable composition dispersion solution (1): 300 parts by mass

Aluminum polychloride: 0.20 parts by mass

Ion exchange water: 300 parts by mass

To a raw material solution obtained by mixing the above components, nitric acid is added to adjust the pH to 3.5, followed by thoroughly mixing and dispersing with a homogenizer (trade name: Ultra-turrax T50, produced by IKA Corp.), further followed by transferring into a flask, still farther followed by heating with a heating oil bath to 40° C. while agitating with a Three-One motor, after holding at 40° C. for 60 min, followed by further adding 300 parts by mass of a resin particle dispersion solution and slowly agitating at 60° C. for 2 hr. Thereby, a photosensitive/thermosensitive capsule dispersion solution (1) is obtained.

A volume average particle diameter of the photosensitive/thermosensitive capsules dispersed in the dispersion solution is 3.53 μm. Furthermore, during the preparation of the dispersion solution, a spontaneous color forming of the dispersion solution is not observed.

-Preparation of Photosensitive/thermosensitive Capsule Dispersion Solution (2)-

Microcapsule dispersion solution (2): 150 parts by mass

Photocurable composition dispersion solution (2): 300 parts by mass

Aluminum polychloride: 0.20 parts by mass

Ion exchange water: 300 parts by mass

Except that as a raw material solution the above components are used, similarly to a case where the photosensitive/thermosensitive capsule dispersion solution (1) is prepared, a photosensitive/thermosensitive capsule dispersion solution (2) is obtained.

A volume average particle diameter of the photosensitive/thermosensitive capsules dispersed in the dispersion solution is 3.52 μm. Furthermore, during the preparation of the dispersion solution, a spontaneous color forming of the dispersion solution is not observed.

-Preparation of Photosensitive/thermosensitive Capsule Dispersion Solution (3)-

Microcapsule dispersion solution (3): 150 parts by mass

Photocurable composition dispersion solution (3): 300 parts by mass

Aluminum polychloride: 0.20 parts by mass

Ion exchange water: 300 parts by mass

Except that as a raw material solution the above components are used, similarly to a case where the photosensitive/thermosensitive capsule dispersion solution (1) is prepared, a photosensitive/thermosensitive capsule dispersion solution (3) is obtained.

A volume average particle diameter of the photosensitive/thermosensitive capsules dispersed in the dispersion solution is 3.47 μm. Furthermore, during the preparation of the dispersion solution, a spontaneous color forming of the dispersion solution is not observed.

-Preparation of Toner-

Photosensitive/thermosensitive capsule dispersion solution (1): 750 parts by mass Photosensitive/thermosensitive capsule dispersion solution (2): 750 parts by mass Photosensitive/thermosensitive capsule dispersion solution (3): 750 parts by mass A solution obtained by mixing above components is transferred in a flask, heated to 42° C. with a heating oil bath under agitation and kept at 42° C. for 60 min, followed by further adding 100 parts by mass of a resin particle dispersion solution and slowly agitating.

Thereafter, 0.5 mol/L sodium hydroxide aqueous solution is added to adjust the pH in the flask to 5.0, followed by heating to 55° C. under agitation. During a temperature rise to 55° C., usually, the pH in the flask goes down to 5.0 or less. However, here, a sodium hydroxide aqueous solution is further dropped so that the pH may not be 4.5 or less. In this state, the solution is held at 55° C. for 3 hr.

After the end of the reaction, the solution is cooled, filtered and thoroughly washed with ion exchange water, followed by applying a solid-liquid separation with a Nutche-type suction filter. The solid component is re-dispersed in 3 liter ion exchange water at 4020 C. in a 5 liter beaker and agitated at 300 rpm for 15 min, followed by washing. The washing operation is repeated 5 times, followed by applying a solid-liquid separation with a Nutche-type suction filter, further followed by applying vacuum freeze-dry for 12 hr, and thereby toner particles in which photosensitive/thermosensitive capsules are dispersed in a styrene resin is obtained. Particle diameters of the toner particles are measured with a Coulter Counter and a volume average particle diameter D50v is 15.2 μm.

Subsequently, to 50 parts by mass of the toner particle, 1.0 parts by mass of hydrophobic silica (trade name: TS720, produced by Cabbot Corp.) is added, followed by mixing with a sample mill, and thereby an externally added toner is obtained.

(Developer)

As a carrier, one obtained in such a manner that a 30 mass % styrene-acryl copolymer (number average molecular weight: 23,000, weight average molecular weight: 98,000, Tg: 78° C.) and 70 mass % particulate magnetite (maximum magnetization: 80 emu/g, average particle diameter: 0.5 μm) are kneaded, pulverized and classified so as to be 100 μm in the volume average particle diameter is used, the toner is weighed so as to be 5 mass % in the toner concentration, followed by mixing with a ball mill for 5 min, and thereby a developer 1 is obtained.

(Image Formation)

An image forming apparatus such as shown in FIG. 1 is prepared and the developer is charged in a developing apparatus 16.

As a photoreceptor 10, one obtained in such a manner that on a surface of a transparent substrate made of cylindrical glass ITO is sputtered to form an electric conductive layer, on the electric conductive layer, a 25 μm thick multilayer organic photosensitive layer of which a charge generation layer contains gallium phthalocyanin and a charge transportation layer contains N,N'-diphenyl-N,N'-bis(3-methylphenyl)-[1,1']biphenyl-4,4'-diamine is coated and formed is used. As a charging unit 12, a scorotron is used.

As an exposing apparatus 14, an LED image bar that has a wavelength of 780 nm and can form a latent image at the resolution of 600 dpi is used. The developing apparatus 16 is one that is provided with a metal sleeve for use in two-component magnetic brush development and can apply a reverse development. An amount of electrostatic charge of the toner when the developer 1 is charged in the developing unit is substantially −5 to −30 μC/g.

As a color forming information applying unit 28, inside of a photoreceptor 10, an LED image bar that can illuminate lights of a peak wavelength 405 nm (exposure amount: 0.2 mJ/cm$^2$), a peak wavelength 532 nm (exposure amount: 0.2 mJ/cm$^2$) and a peak wavelength 657 nm (exposure amount: 0.4 mJ/cm$^2$) and has the resolution of 600 dpi is disposed to enable to expose, after development, at a position of 5 nm above the photoreceptor. A transfer apparatus 18 has a semi-conductive roll obtained by covering a conductive elastic body on an outer periphery of a conductive core material as a transfer roll. The conductive elastic body is formed by dispersing two kinds of carbon blacks made of Ketchen black and thermal black in an incompatible blend made by blending NBR and EPDM and has the roll electric resistance of $10^{8.5}$ Ω·cm and the Asker C hardness of 35 degree.

As a fixing apparatus 22, a fixing unit used in DPC1616 (trade name, produced by Fuji Xerox Co., Ltd.) is used and disposed to a position 30 cm from a point where color forming information is applied. Furthermore, as an illuminating means 24, a high-brightness Shaukasten containing three wavelengths of the color forming information applying unit is used with an illuminating width of 5 mm.

With the above-configured image forming unit, printing conditions are set as follows.

Line speed of photoreceptor: 10 mm/sec.

Charging condition: A voltage of −400 V is applied to a screen of a Scorotron and a direct current voltage of −6 kV is applied to a wire. At this time, a surface potential of the photoreceptor is −400 V.

Exposure: Exposure is applied at a logical sum of image information of four colors of Y, M, C and black and a potential after exposure is substantially −50 V.

Development bias: A rectangular wave AC having Vpp of 1.2 kV (3 kHz) is superposed on a direct current of −330 V.

Contact condition of developer: A circumferential speed ratio (development roll/photoreceptor) is set at 2.0, a development gap is set at 0.5 mm, a weight of the developer on the development roll is set at 400 $g/m^2$ and an amount of developed toner of a solid image on the photoreceptor is set at 5 $g/m^2$.

Transfer bias: A direct current of +800 V is applied.

Fixing temperature: A surface temperature of a fixing roll is set at 180° C.

Illuminance of illuminator: 130,000 lux.

Under the above conditions, of the respective colors of Y, M, C, R, G, B and K, a chart having a gradation image portion is printed. Color forming information is applied to the toner in combinations shown in a table 1 shown below (showing that, when an LED with mark ○ is emitted, a toner having a desired color colors). Furthermore, since the color forming density is controlled by emission intensity or emitting time, a time interval of 1 dot is divided into 8 to apply time width modulation.

TABLE 1

| | | Color forming color | | | | | | | |
|---|---|---|---|---|---|---|---|---|---|
| | | Y color | M color | C color | R color | G color | B color | K color | W color |
| LED Wavelength | 405 nm | | ○ | ○ | | | ○ | | ○ |
| | 532 nm | ○ | | ○ | | ○ | | | ○ |
| | 657 nm | ○ | ○ | | ○ | | | | ○ |

(Image Evaluation)

Print samples obtained under the above conditions are evaluated as follows.

-Color Forming Density-

Of each of Y, M and C colors, an image density of a solid image is investigated with a densitometer X-Rite 938 (trade name, produced by X-Rite Corp.). It is confirmed that all colors show sufficient color development of the image density of 1.5 or more.

-Color Reproducibility-

Of each of R, G, B, Y, M and C colors, the color reproducibility is investigated with a gradation chart with an increment of 5% from 5% to 100%. It is confirmed that all colors are excellent in the color balance and the color reproducibility.

Figure 15:
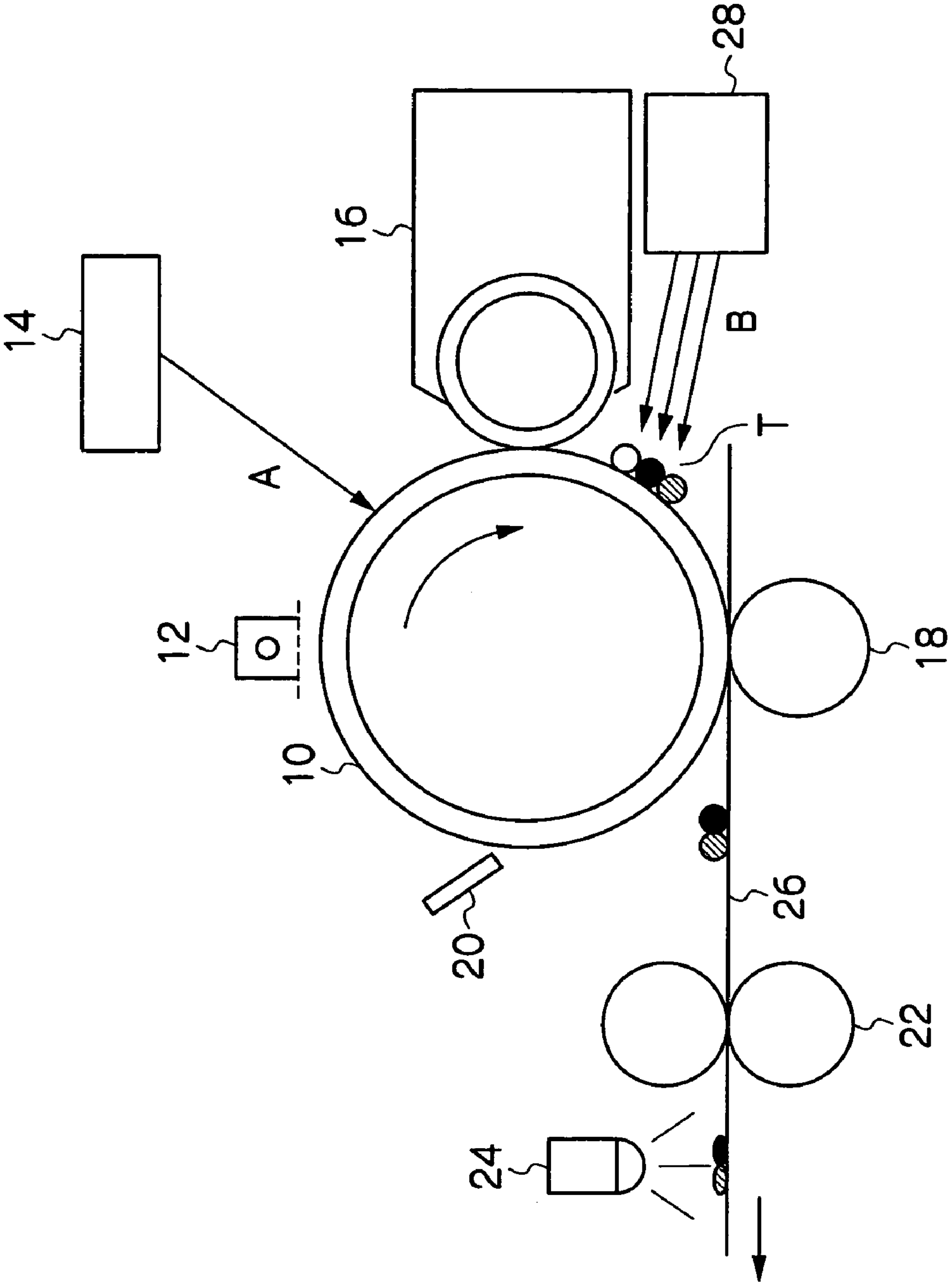
FIG. 15 is a schematic configurational diagram showing an image forming apparatus that carries out color forming information applying exposure from a surface side of a photoreceptor.

In the next place, in the image forming apparatus shown in FIG. 1, the color forming information applying unit 28 is removed from the inside of the photoreceptor 10, and, as shown in FIG. 15, the color forming information applying unit 28 is disposed outside of the photoreceptor 10 so as to be able to similarly expose, after the development, a position at 5 mm above a surface of the photoreceptor. An amount of exposure is adjusted so as to be substantially same as that when the photoreceptor is exposed from a back surface.

With other conditions set same as that in the case of exposing from the back surface, an image is formed and evaluated similarly.

As a result, the color forming density is substantially 1.2 and the color reproducibility neither has a practical problem but is a little bit inferior to a case exposed from a back surface of the photoreceptor.

As mentioned above, in an image forming apparatus (image forming method) where color forming information applying light is exposed from a back surface side of a photoreceptor, in comparison with a case where the color forming information applying light is exposed from a front surface side of a photoreceptor, the color forming property of a toner is excellent, the color reproducibility is as well excellent and a high quality image can be obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. An image forming apparatus comprising:

an image holding member;

a toner image forming unit that forms a toner image of toner on a surface of the image holding member;

a color forming information applying unit that applies, with light, color forming information to the toner image formed on the surface of the image holding member;

a transferring unit that transfers the toner image applied with the color forming information onto a surface of a recording medium;

a fixing unit that fixes the toner image transferred on the surface of the recording medium;

a color forming unit that forms a color of the toner image applied with the color forming information;

the toner being controlled by being applied with the color forming information with light so as to hold a state that can form a color or a state that cannot form a color;

the color forming information applying unit exposing, from a back surface side of the image holding member, the toner image formed on the surface of the image holding member to apply the color forming information to the toner image with light transmitted through the image holding member; and a reflecting unit disposed on a surface side of the image holding member corresponding to a position of exposure from the back surface side, the reflecting unit reflecting the light that applies color forming information to the toner image that is transmitted through the image holding member back toward the toner image.

2. The image forming apparatus according to claim 1, wherein the color forming information applying unit is disposed inside of the image holding member.

3. The image forming apparatus according to claim 1, wherein the fixing unit also functions as the color forming unit.

4. The image forming apparatus according to claim 1, wherein the image holding member is a photoreceptor and the toner image forming unit includes a charging unit that charges a surface of the photoreceptor, an exposure unit that forms an electrostatic latent image by exposing a surface of the photoreceptor and a developing unit that develops the electrostatic latent image with a developer containing the toner and forms a toner image.

5. The image forming apparatus according to claim 4, wherein the exposure unit that forms an electrostatic latent image is disposed inside of the photoreceptor.

6. The image forming apparatus according to claim 4, wherein the photoreceptor has effective sensitivity in a color forming wavelength region.

7. The image forming apparatus according to claim 4, wherein the photoreceptor does not have effective sensitivity in the color forming wavelength region.

8. The image forming apparatus according to claim 1, wherein the image holding member is dielectric.

9. The image forming apparatus according to claim 1, further comprising a light irradiation unit that irradiates light onto the surface of the recording medium after fixing.

10. The image forming apparatus according to claim 1, wherein the toner has a first component and a second component that are present separated from each other and form a color when reacted with each other and a photocurable composition containing any one of the first component or the second component, and, by applying the color forming information with light, the photocurable composition holds a cured or uncured state to control the reaction for color forming.

11. The image forming apparatus according to claim 1, wherein the toner contains a yellow-color forming portion, a magenta-color forming portion and a cyan-color forming portion in a single toner particle.

12. An image forming method comprising:

forming a toner image on a surface of an image holding member;

applying color forming information with light to the toner image formed on the surface of the image holding member;

transferring the toner image applied with the color forming information onto a surface of a recording medium;

fixing the toner image transferred on the surface of the recording medium;

color forming the toner image applied with the color forming information;

controlling the toner, by applying the color forming information with light, so as to hold a state that can form a color or a state that cannot form a color, in the applying the color forming information, the toner image formed on the surface of the image holding member being exposed from the back surface side of the image holding member to apply the color forming information to the toner image with light transmitted through the image holding member; and reflecting the light, by a reflecting unit disposed on a surface side of the image holding member corresponding to a position of exposure from the back surface side, that applies color forming information to the toner image that is transmitted through the image holding member back toward the toner image.

13. The image forming method according to claim 12, wherein the image holding member is a photoreceptor and forming the toner image includes charging a surface of the photoreceptor, exposing the surface of the photoreceptor to form an electrostatic latent image thereon and developing the electrostatic latent image with a developer containing the toner to form a toner image.

14. The image forming method according to claim 13, wherein the forming of the electrostatic latent image and the developing are simultaneously carried out.

15. The image forming method according to claim 13, wherein the applying color forming information with the light is carried out after the developing.

16. The image forming method according to claim 13, wherein the applying color forming information with the light is carried out simultaneously with the developing.

* * * * *